United States Patent
Irwin et al.

(10) Patent No.: US 8,294,292 B2
(45) Date of Patent: Oct. 23, 2012

(54) POWER SUPPLY SYSTEM

(75) Inventors: Kevin M. Irwin, Tucson, AZ (US);
Carlos Antonio Lopez Abundis, Yuma, AZ (US); David Addai-Gyansa, Fontana, CA (US); JeanPaul Vitali Bell, Salt Lake City, UT (US); Jonathan Heitzinger, Flagstaff, AZ (US); Juan Carlos Lopez, Yuma, AZ (US); Scott A. McLeod, Tucson, AZ (US); John Stuart Saenz, Sierra Vista, AZ (US); Christopher J. Sandy, Tucson, AZ (US); Dustin Robert Stone, Costa Mesa, CA (US); Brett J. Wham, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 726 days.

(21) Appl. No.: 12/428,429

(22) Filed: Apr. 22, 2009

(65) Prior Publication Data
US 2010/0270803 A1 Oct. 28, 2010

(51) Int. Cl.
*F03B 13/00* (2006.01)
*F03B 13/10* (2006.01)
(52) U.S. Cl. .................. 290/54; 290/43; 290/52
(58) Field of Classification Search .......... 290/43, 290/52, 54; 137/12; 239/67, 70
See application file for complete search history.

(56) References Cited

U.S. PATENT DOCUMENTS

| | | |
|---|---|---|
| 2,871,790 A | 2/1959 | Weills |
| 3,664,125 A | 5/1972 | Strange |
| 3,668,412 A | 6/1972 | Vrana et al. |
| 3,750,001 A | 7/1973 | McCloskey |
| 3,779,514 A | 12/1973 | O'Connor, Jr. |
| 3,898,471 A | 8/1975 | Schera, Jr. |
| 4,009,395 A | 2/1977 | Long et al. |
| 4,142,367 A | 3/1979 | Guisti |
| 4,145,885 A | 3/1979 | Solell |
| 4,260,901 A | 4/1981 | Woodbridge |
| 4,311,170 A | 1/1982 | Dolan |
| 4,317,048 A | 2/1982 | Kime |
| 4,337,786 A | 7/1982 | Myers et al. |

(Continued)

FOREIGN PATENT DOCUMENTS

CA 2606464 A1 10/2007

OTHER PUBLICATIONS

John Deere Irrigation Trade Show Flyer; Oct. 2008; 1 pg.

(Continued)

*Primary Examiner* — Quyen Leung
*Assistant Examiner* — Jose Gonzalez Quinones
(74) *Attorney, Agent, or Firm* — Fitch, Even, Tabin & Flannery, LLP

(57) ABSTRACT

An irrigation power system is provided for use with a conventional irrigation conduit having water flow therethrough as a source of hydro energy. In order to convert the hydro energy of the water flow to electrical energy, a power generation module is provided along the irrigation conduit. The electrical energy provided by the power generation module is then provided to a power conditioner to alter the electrical energy to produce a predetermined current. The predetermined current is then sent to a storage device for later use. An irrigation system component then communicates with the storage device to receive electrical power for selective operation of the component.

35 Claims, 20 Drawing Sheets

U.S. PATENT DOCUMENTS

| | | | |
|---|---|---|---|
| 4,352,025 A | 9/1982 | Troyen | |
| 4,392,060 A | 7/1983 | Ivy | |
| 4,490,621 A | 12/1984 | Watabe et al. | |
| 4,518,955 A | 5/1985 | Meyer | |
| 4,560,884 A | 12/1985 | Whittecar | |
| 4,599,858 A | 7/1986 | La Stella et al. | |
| 4,731,545 A | 3/1988 | Lerner et al. | |
| 4,776,772 A | 10/1988 | Everett | |
| 4,805,862 A | 2/1989 | Wissman | |
| 4,838,310 A * | 6/1989 | Scott et al. | 137/624.14 |
| 4,859,157 A | 8/1989 | Adler | |
| 5,038,268 A | 8/1991 | Krause et al. | |
| 5,040,409 A | 8/1991 | Kiewit | |
| 5,048,755 A | 9/1991 | Dodds | |
| 5,085,076 A | 2/1992 | Engelmann | |
| 5,105,094 A | 4/1992 | Parker | |
| 5,427,350 A * | 6/1995 | Rinkewich | 251/30.01 |
| 5,655,561 A | 8/1997 | Wendel et al. | |
| 5,713,729 A | 2/1998 | Hong | |
| 5,806,558 A | 9/1998 | Greverath | |
| 5,825,094 A | 10/1998 | Hess | |
| 5,971,011 A | 10/1999 | Price | |
| 6,209,576 B1 | 4/2001 | Davis | |
| 6,323,774 B1 | 11/2001 | Mitchell | |
| 6,535,827 B1 | 3/2003 | Lestina et al. | |
| 6,552,647 B1 | 4/2003 | Thiessen et al. | |
| 6,666,384 B2 | 12/2003 | Prandi | |
| 6,717,283 B2 | 4/2004 | Skinner et al. | |
| 6,792,799 B2 | 9/2004 | Ford | |
| 6,812,848 B2 | 11/2004 | Candela | |
| 6,933,624 B2 | 8/2005 | Beaston | |
| 6,957,157 B2 | 10/2005 | Lander | |
| 7,030,767 B2 | 4/2006 | Candela | |
| 7,032,435 B2 | 4/2006 | Hassenflug | |
| 7,043,904 B2 | 5/2006 | Newmann | |
| 7,051,576 B2 | 5/2006 | Hutchinson et al. | |
| 7,088,239 B2 | 8/2006 | Basinger et al. | |
| 7,228,726 B2 | 6/2007 | Kates | |
| 7,258,532 B2 | 8/2007 | Welch, Jr. et al. | |
| 7,331,174 B2 | 2/2008 | Welch, Jr. et al. | |
| 7,383,721 B2 | 6/2008 | Parsons et al. | |
| 7,392,817 B2 | 7/2008 | Burlage et al. | |
| 7,429,803 B2 | 9/2008 | Davis | |
| 7,451,777 B2 | 11/2008 | Burlage et al. | |
| 7,462,945 B2 | 12/2008 | Baarman et al. | |
| 7,596,458 B2 | 9/2009 | Lander | |
| 7,668,670 B2 | 2/2010 | Lander | |
| 7,779,852 B2 | 8/2010 | Burlage et al. | |
| 7,819,020 B2 | 10/2010 | Jacobi et al. | |
| 2002/0002425 A1 | 1/2002 | Dossey et al. | |
| 2004/0217189 A1 | 11/2004 | Regli | |
| 2005/0195078 A1 | 9/2005 | Basinger et al. | |
| 2005/0199842 A1 | 9/2005 | Parsons et al. | |
| 2005/0279169 A1 | 12/2005 | Lander | |
| 2006/0157580 A1 | 7/2006 | Regli | |
| 2006/0202051 A1 | 9/2006 | Parsons et al. | |
| 2006/0267758 A1 | 11/2006 | Barth et al. | |
| 2008/0061558 A1* | 3/2008 | Baarman et al. | 290/54 |
| 2008/0136630 A1 | 6/2008 | Leggett et al. | |
| 2008/0143109 A1* | 6/2008 | Pitchford et al. | 290/43 |
| 2008/0266125 A1 | 10/2008 | Windisch et al. | |
| 2008/0284174 A1 | 11/2008 | Nagler | |
| 2009/0001193 A1 | 1/2009 | Parsons et al. | |
| 2009/0085756 A1 | 4/2009 | Atassi | |
| 2009/0179165 A1 | 7/2009 | Parsons et al. | |
| 2009/0207031 A1 | 8/2009 | Barth et al. | |
| 2010/0045471 A1 | 2/2010 | Meyers | |
| 2010/0258204 A1 | 10/2010 | Cipolla | |
| 2010/0289652 A1 | 11/2010 | Javey et al. | |

OTHER PUBLICATIONS

John Deere 2009 News Releases and Information; John Deere Green Tech Wins Irrigation Association New Product Award; Internet document; Apr. 17, 2009; http://www.deere.com/en_US/newsroom/2009/releases/common/01062009; 2 pgs.

* cited by examiner

POWER SUPPLY SYSTEM

FIELD

This invention relates to power supply systems and, more particularly, to power supply systems converting hydro energy to electrical energy.

BACKGROUND

Electric powered components are commonly used in areas remote from a power source. One such use is in irrigation systems for properly irrigating areas of grass, trees, flowers, crops and other types of vegetation. In a typical irrigation system, these components include, for example, valves, controllers, sensors and communication devices. For example, in a typical valve setup, a solenoid is energized to open the valve, which enables water flow through the irrigation conduit downstream of the valve. On the controller side, a remote controller, for example, may communicate with a main controller to receive information, transmit information and calculate and execute watering schedules.

Physical wiring is commonly used to supply electricity from a base source to the remotely located component. Wire is often installed by laying the wire in the trench dug to install the water pipe. Cost associated with wiring includes the cost of the wire itself, cost of holding the wire in inventory, and the labor of handling the wire, making the connections with the system, and where local codes require it, the cost associated with inspection and approval. Eliminating the need for wiring can result in significant installation savings for irrigation contractors.

An alternative to physical wiring is to use a battery system. In this arrangement, each component requiring power would have its own battery. This alleviates the need for physically wiring between each component and to the base power supply. A shortcoming, however, with this approach is that it requires frequent battery changes due to the limited charge and lifespan of the batteries. Depending on the frequency of use, the batteries can require changing every year, and this process can involve unearthing irrigation components, which results in additional labor time and unsightly damage to the irrigation area.

Accordingly, there is a need for being able to supply irrigation components in the field with electrical power that does not have the shortcomings of requiring the expense of physical wiring or frequent battery changes. The present invention addresses these needs and provides further related advantages.

DETAILED DESCRIPTION OF THE PREFERRED EMBODIMENT(S)

Figure 1:
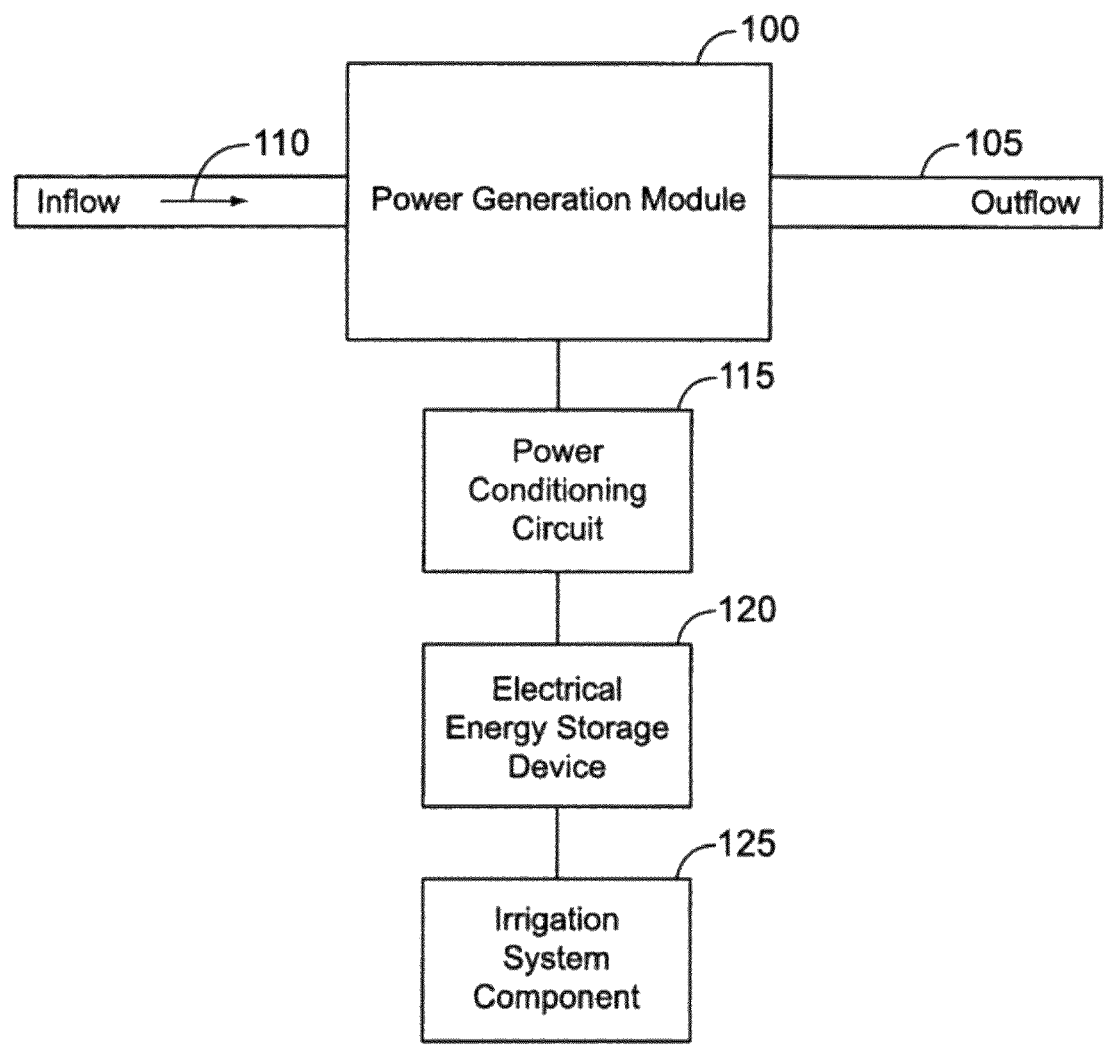
FIG. 1 is block diagram of an irrigation power system configured in accordance with various features of the invention.

FIG. 1 illustrates an exemplary irrigation power system. A conventional irrigation conduit 105 with water flow, as shown by an arrow 110 (water flowing left to right). The water flow 110 is a source of hydro energy. In order to convert the hydro energy of the water flow 110 to electrical energy, a power generation module 100 communicates with the water flow 110 through the conduit 105 to utilize the water flow 110 without significant relative energy loss to the water flow 110. The power generation module 100 generates electrical energy and provides it to a power conditioning circuit 115, which alters the electrical energy to produce a predetermined current range. An electrical energy storage device 120 then communicates with the power conditioning circuit 115 to receive the current in the predetermined range for storage. In the case where the electrical storage device 120 is a battery, the predetermined current could be used to charge the battery. The battery may comprise a nickel-metal-hydride (NiMH), nickel-cadmium (NiCd), lithium-ion (Li-ion), or lead-acid battery. Other embodiments of the electrical storage device 120 may include capacitors. An irrigation system component 125 may communicate with the stored electrical power to receive electricity to power the component. The component 125 may include, without limitation, a valve, an electric rotor, a controller, a wireless communication device, landscape lighting, or sensors.

In one example, the power generation module 100 includes a moveable surface communicating with the water flow 110 in the irrigation conduit 105 to interface with the hydro energy. The force of the water flow 110 against the surface moves the surface. The mechanical movement is then converted to electrical energy.

Figure 2:
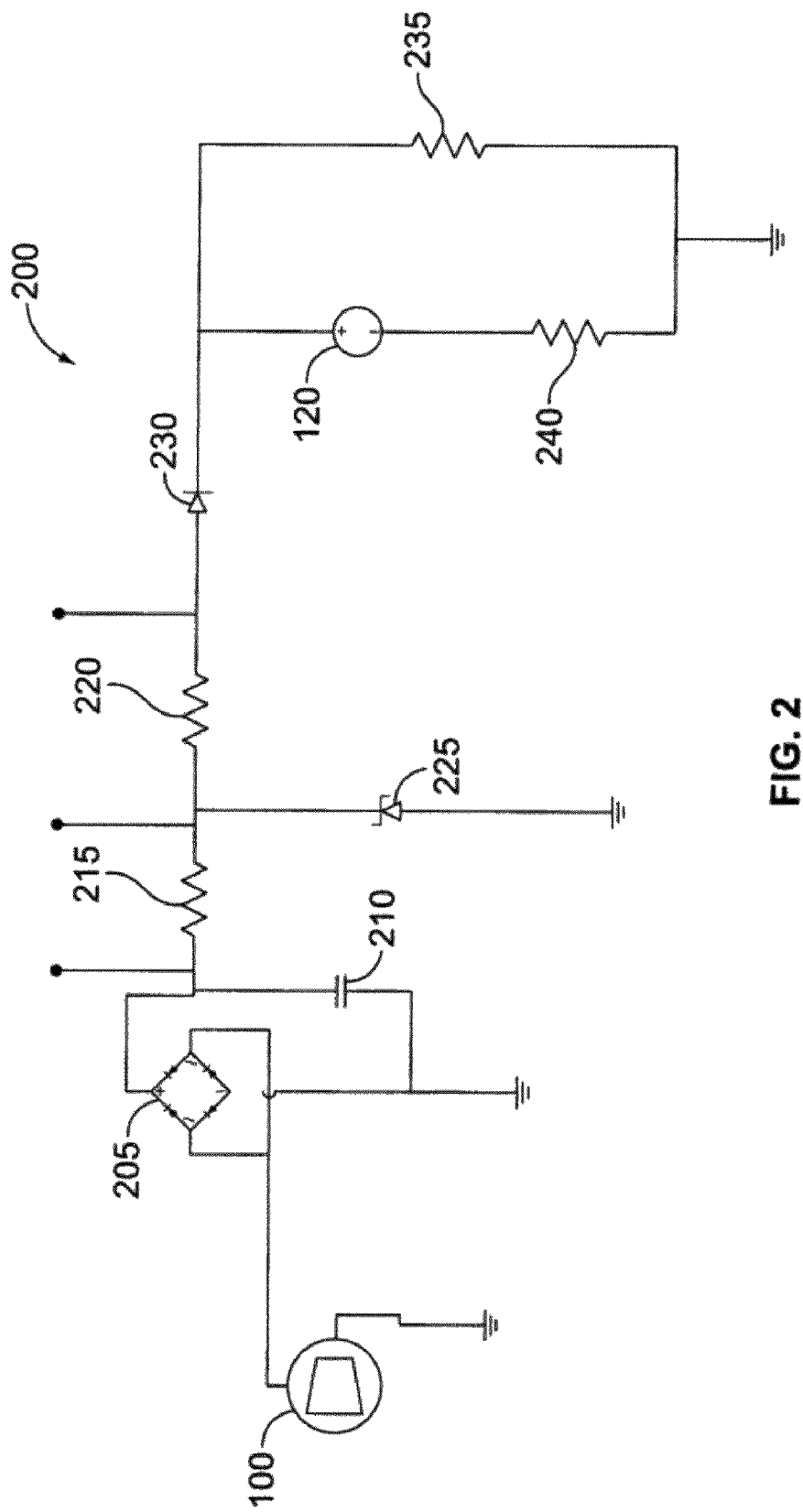
FIG. 2 is a power conditioning circuit configured in accordance with various features of the invention.

FIG. 2 illustrates an example power conditioning circuit 115. Other circuit design elements can be used to convert the energy generated by the power generation module 100 into electrical energy capable of being stored, including a form capable of charging the electrical energy storage device 120.

As shown in the power conditioning circuit 200, the power generation module 100 communicates with a diode bridge 205. The diode bridge 205 is connected to a capacitor 210 and a first resistor 215. The capacitor 210 may be a smoothing capacitor and also could utilize a capacitor input filter (not shown). The first resistor 215 connects to a second resistor 220 and an overvoltage protection diode 225. The second resistor 220 connects to a second diode 230. The second diode 230 prevents battery discharge due to shunt diode during normal timer operation. The second diode 230 connects to electrical energy storage device 120 and to the irrigation component 235, which has an intrinsic resistance, and is therefore represented in FIG. 2 as a resistor. The battery also has an intrinsic resistance, which must be represented separately from its storage capability, and is therefore shown in FIG. 2 as a resistor 240.

By one approach, the first resistor 215 has a value of ~10.8Ω, the second resistor 220 has a value of 13.5Ω, the irrigation component resistance 235 has a value of 300Ω, and the resistance of the electrical energy storage device 240 has a value of ~1.25Ω. The charge current has a value of ~40 mA and the electrical energy storage device 120 is 9 V. These values are assumed on a 15 V generated amplitude with assumed 23 J replacement required with confidence factor ~4 for estimated values, which can be reduced. At 40 mA, the additional current through the timer is negligible, on the order of nA.

This irrigation power system can eliminate the need for physical hard wiring from established power supplies. The irrigation power system also can be utilized with existing irrigation systems, requiring only a removed section of irrigation conduit proximate to the irrigation component requiring a power supply. In addition, this irrigation power system can be utilized in any size configuration because it can be scaled up and down as needed to accommodate different sizes of pipe.

Additionally, this irrigation power system is versatile. For example, it can be utilized "in line" with irrigation systems, such as in a valve box, which can be located underground or utilized aboveground. Alternatively, the irrigation power system can be sealed and buried without a valve box.

Figure 3:
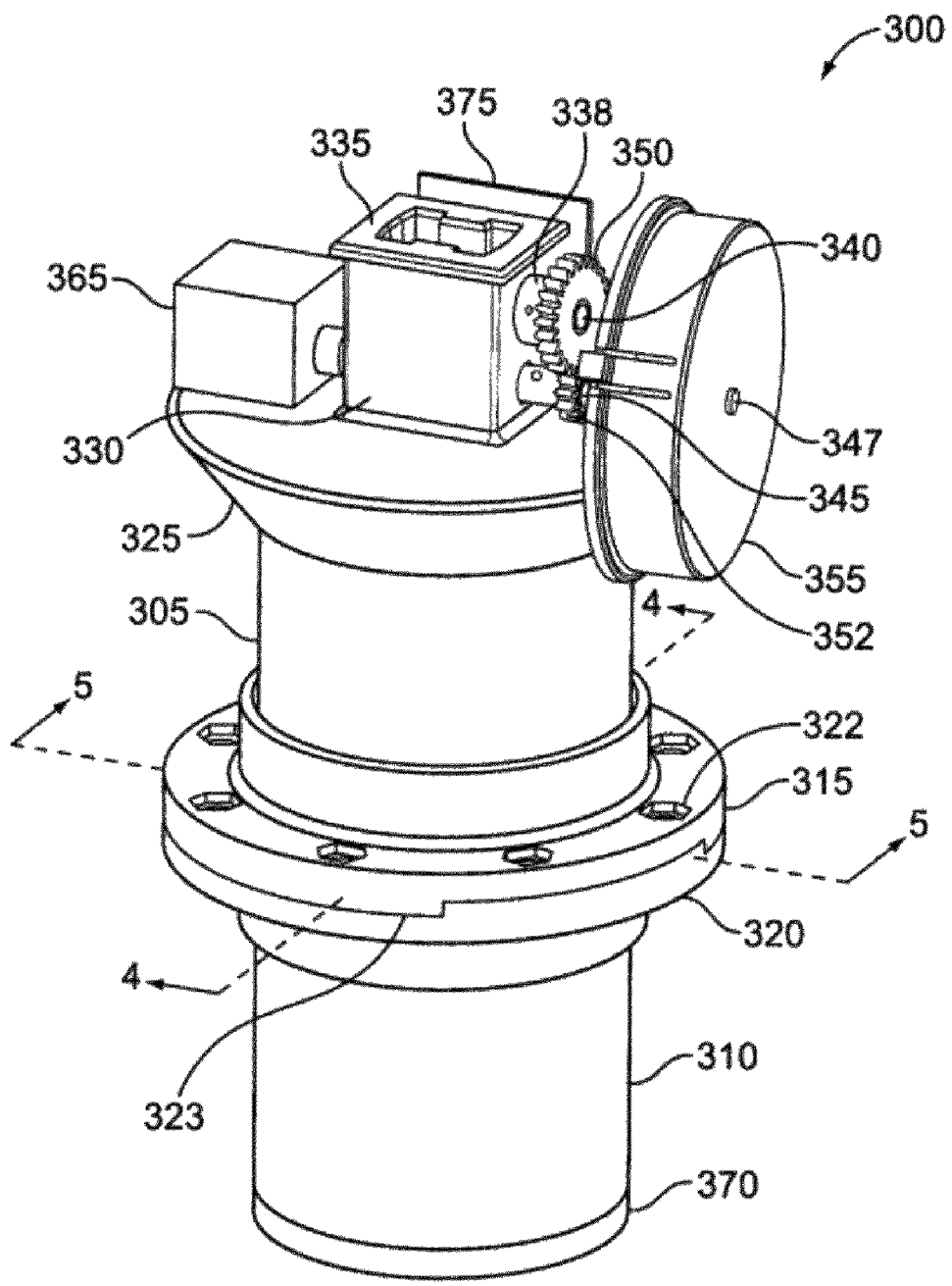
FIG. 3 is a perspective view of a power generation module configured in accordance with various features of the invention.

Referring to FIG. 3, an exemplary power generation module 100 includes a piston module 300 having the moveable surface communicating with the water flow 110 in the irrigation conduit 105 to interface with the hydro energy. In this example, the piston module 300 has a first piston cylinder 305 and a second piston cylinder 310. The first and second piston cylinders 305, 310 have a first flange 315 and a second flange 320, respectively. The first flange 315 and the second flange 320 are secured together by at least one screw inserted into at least one screw hole 322. Preferably, the first flange 315 and the second flange 320 are secured together by a series of screws, such as eight screws, spaced equidistant around the first flange 315 and the second flange 320. Optionally, the first flange 315 and the second flange 320 can have overlapping edges 323 to prevent rotation between them and facilitate correctly securing them together. Alternatively, a single piston cylinder could be utilized with an attached sealing arrangement, such as, for example, a seal on the outer diameter of the piston.

The piston module 300 includes a piston cap 325. The piston cap 325 attaches to, and is sealed to, an upstroke end of the first piston cylinder 305 by an adhesive. Alternatively, the piston cap 325 can be secured to the first piston cylinder 305 by other suitable methods, such as by welding, threading, or hardware.

The piston cap 325 includes a rack housing guide 330. The rack guide 330 is shaped to communicate with a rack 335 and includes an opening that allows the rack 335 to reciprocate longitudinally therethrough. The rack guide 330 includes openings to house a gear system 338. The gear system 338 communicates with the rack 335 to convert the linear energy of the rack 335 into rotational energy. The gear system 338 includes a pinion shaft 340 with a pinion gear 350 and a motor shaft 345 with a motor gear 352, which are described further below with reference to FIGS. 4-6.

By one approach, the gear system 338 may be directly coupled to a generator 365 to rotate elements inside the generator 365 to create electrical energy. Due to the nature of the irrigation system, each time the water flow 110 is allowed to flow in the irrigation conduit 105, the piston module 300 produces one upstroke. When the water flow 110 in irrigation conduit 105 is stopped, piston module 300 produces one downstroke. Together this upstroke and downstroke constitute one operational cycle. The gear system 338 communicates with a spring motor 355 having a spring coupling 357 to store the rotational energy and reproduce it at a faster rate, at the ends of the piston strokes, to drive the generator 365, such as a DC motor. More specifically, one end of the motor shaft 345 communicates with the spring motor 355 and the other end communicates with the generator 365. A range of energy outputs can be achieved by altering the characteristics of the spring motor 355, such as utilizing a spring with more or less energy storage capability. Alternatively, additional energy can be stored and released through the use of a second spring motor disposed in parallel with the spring motor 355 and coupled to the motor shaft 345. Additional springs can be employed taking into consideration the power of the water flow 110 needed to drive the rotation of the springs and the space available for the piston module 300.

During operation of the piston module 300, which is described in greater detail below with reference to FIGS. 4-6, the rack 335 is driven upward causing the pinion shaft 340 to rotate, and through the gear system 338, the motor shaft 345 to rotate. The rotation of the motor shaft 345 causes the spring motor 355 to store energy. When the spring motor 355 releases the stored energy, the motor shaft 345 drives the generator 365 to generate electrical power. Preferably, the spring motor 355 is a coil spring which winds to store power as a result of the rotation of the motor shaft 345. The spring motor 355 then unwinds to rapidly rotate the motor shaft 345 to drive the generator 365 to generate electrical power.

The piston module 300 also includes a bushing 370. The bushing 370 is sized to connect the piston module 300 with the irrigation conduit 105. The bushing 370 is attached to, and sealed to, the second piston cylinder 310 by adhesive. Alternatively, the bushing 370 can be secured to the second piston cylinder 310 by other suitable methods, such as by welding, threading, and hardware.

The generator 365 is electrically coupled to a circuit board 375. The generator 365 supplies electrical energy to the circuit board 375, and the circuit board 375 alters the electrical energy so as to be acceptable to electrical energy storage device 120. The circuit board 375 is composed of a circuit, such as the example circuit illustrated in FIG. 2 and described above. A person of ordinary skill in the art will appreciate that other circuits and circuit elements can be used to supply useable electrical power for storage.

Figure 4:
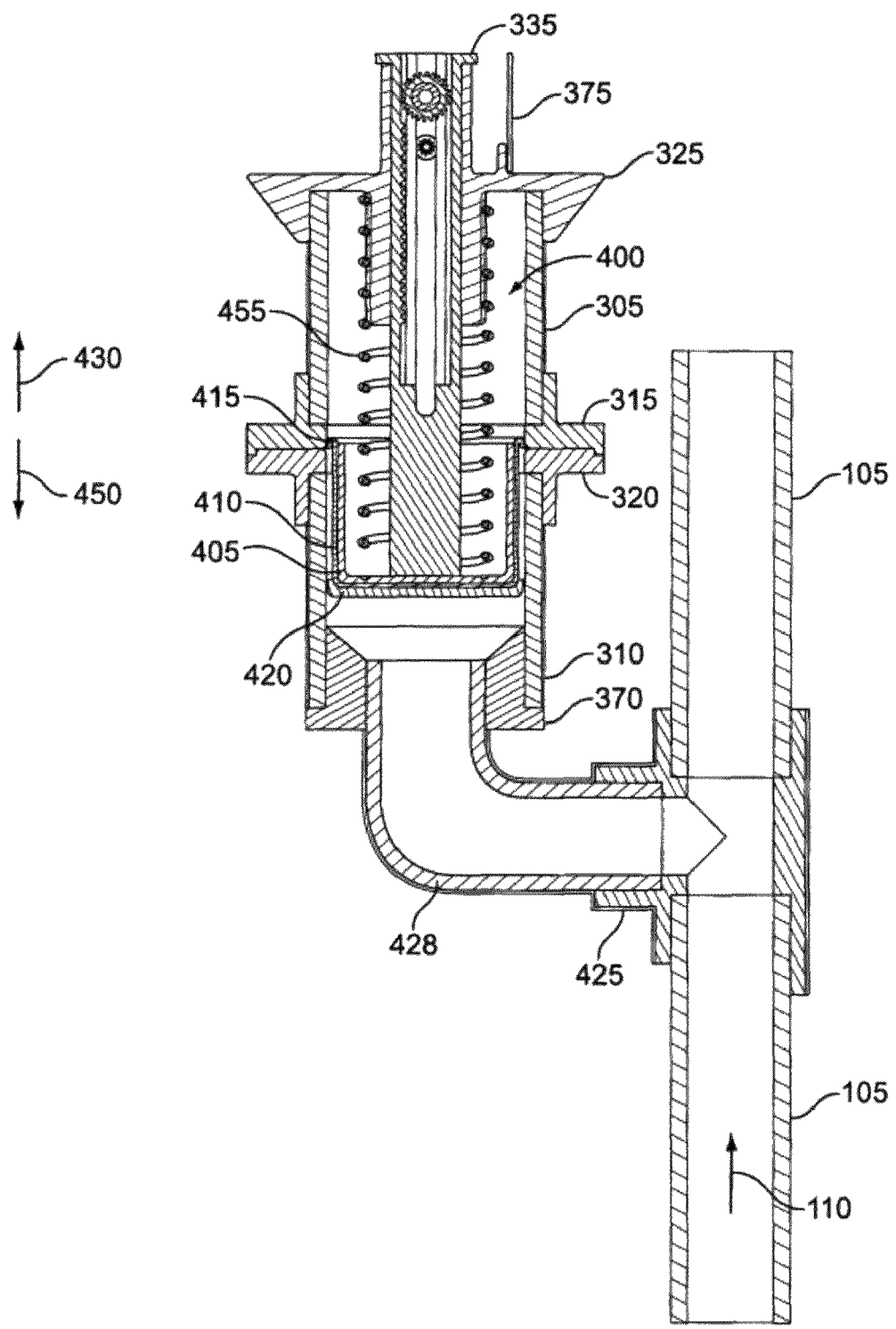
FIG. 4 is a cross section of the power generation module of FIG. 3 taken along line 4-4 in FIG. 3.
Figure 5:
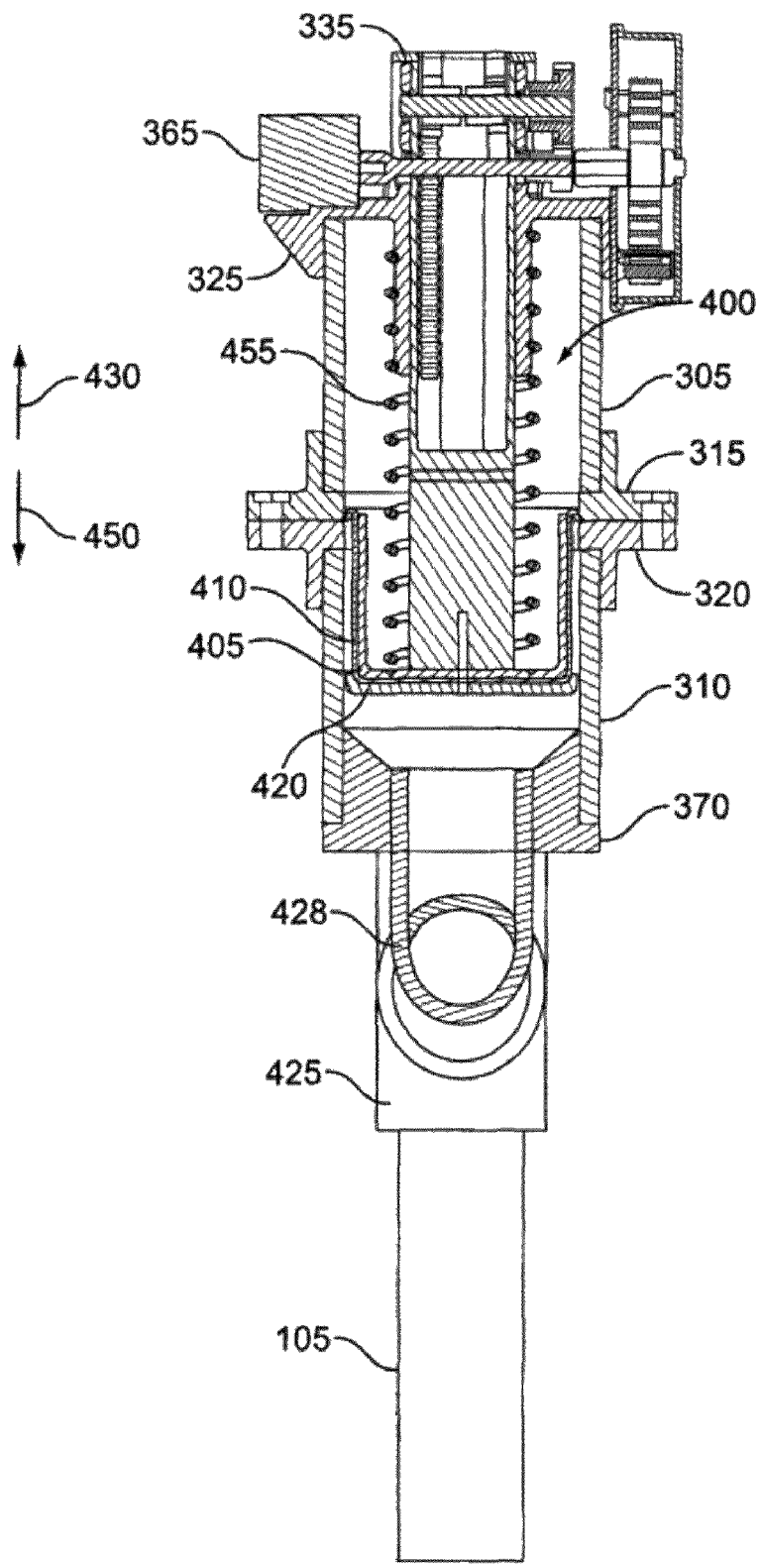
FIG. 5 is a cross section of the power generation module of FIG. 3 taken along line 5-5 in FIG. 3.

Referring now to FIGS. 4 and 5, the piston module 300 includes a piston assembly 400. The rack 335 extends through the piston cap 325 and the first piston cylinder 305 and into the second piston cylinder 310. The rack 335 is coupled to a piston skirt 405.

A rolling diaphragm 410 may be disposed around the piston skirt 405. The rolling diaphragm 410 includes an edge that is secured between the first and second flanges 315, 320 to prevent water from entering the first piston cylinder 305 and preventing grit contained in the water flow 110 from interfering with the moving parts of the piston module 300. The rolling diaphragm 410 covers the bottom and extends up over the side walls of the piston skirt 405 producing a lip 415 of extra material that doubles back over itself to reach the connection between the first and the second flanges 315, 320. A benefit of preventing the water flow 110 from entering the first piston cylinder 305 is that the rolling diaphragm 410 contains the hydro energy of the water flow 110 to act on the piston skirt 405 rather than losing some of the hydro energy by allowing water to flow past the piston skirt 405.

If desired, the rolling diaphragm 410 may be secured to the piston skirt 405 and the rack 335 using a retainer plate 420 and a connector 500 (FIG. 5), to move therewith. The rolling diaphragm 410 is made of flexible material allowing it to travel with the piston assembly 400 during movement. The lip 415 also can be utilized during the travel of the piston assembly 400. If the piston assembly 400 extends further into the second cylinder 310, the extra diaphragm material of the lip 415 can be used to extend the rolling diaphragm 410 further into the second piston cylinder 310 without breaking or ripping.

A tee joint 425 coupled to the bushing 370 may be used to connect the piston module 300 to the irrigation conduit 105. The attachment of the tee joint 425 may be done by any suitable method, such as by adhesive, welding, threading, and hardware. The second piston cylinder 310 tees off from the irrigation conduit 105 to house the piston assembly 400. As the water flows through the irrigation conduit 105, the water flow 110 enters the second piston cylinder 310 through the tee joint 425 and causes movement of the piston assembly 400. This movement captures the hydro energy to be converted into electrical energy. If desired, an elbow joint 428 may be secured between the bushing 370 and the tee joint 425 to position the piston module 300 parallel with the irrigation conduit 105 in order to conserve space. The elbow joint 428 may be secured to the bushing 370 and the tee joint 425 by any suitable method, such as by adhesive, welding, threading, or hardware.

As the water flow 110 enters the second piston cylinder 310, it drives the piston assembly 400 in a first direction (arrow 430), such as an upstroke direction. The water pressure forces the piston assembly 400 in the first direction 430. As the piston assembly 400 is driven in the first direction 430, by virtue of being disposed and held between the first and the second flanges 315, 320, the rolling diaphragm 410 doubles over and extends the lip 415 in the first direction 430.

Movement of the rack 335 in the first direction 430 causes the rack 335 to translate through the rack guide 330 of the piston cap 325. While the rack 335 moves through the rack guide 330, it drives the gear system 338. More specifically, a plurality of teeth 620 (FIG. 6) disposed on the rack 335 engage the gear system 338, discussed in further detail below with reference to FIG. 6. The rack 335 drives rotation of the pinion shaft 340 to rotate the pinion 350. The pinion 350, coupled to the pinion shaft 345, drives the rotation of the motor gear 352 and the motor shaft 345. By virtue of having a positive gear ratio, i.e., the pinion 350 is larger than the motor gear 352, the motor shaft 345 is driven at a faster rate than the pinion shaft 340. Through this process, the linear energy of the rack 335 is converted to rotational energy to wind the spring motor 355.

As the water flow 110 drives the piston assembly 400 in the first direction 430, a toothless slot 645 (FIG. 6) on the rack 335 eventually reaches the gear system 338. The toothless slot 645 disengages the gear system 338 from the rack 335 and allows free rotation of the gear system 338. The spring motor 355 unwinds and rotates the motor shaft 345 to generate electricity through engagement with the generator 365. The spring motor 355 produces a faster rate of rotation of the motor shaft 345 than when the motor shaft 345 is driven only by the piston assembly 400. This faster rate of rotation produces electricity more efficiently with the generator 365. If, however, less energy is required, the piston module 300 can be operated without springs.

When the water flow 110 is shut off through the irrigation conduit 105, which alleviates the force on the piston assembly 400, the piston assembly 400 then travels in a second direction (arrow 450), i.e., a downstroke direction. To provide the restoring force necessary for The return spring 455 engages the piston skirt 405 and is driven in the first direction 430 by the force of the water flow 110. The return spring 455 then engages the piston cap 325 and compresses with a first movement of the piston assembly 400, storing energy within the return spring 455, with a restoring force that is not greater than the force exerted by the water flow 110 on the piston assembly 400. Then, when the water flow 110 is shut off through the irrigation conduit 105, the return spring 455 expands and drives the piston assembly 400 in the second direction 450 to cause a second movement of the piston assembly 400 returning the piston assembly 400 to its original position. Additionally, the return spring 455 must supply beyond the maximum resistive force of the spring motor 355 at the end of the downstroke in order to allow the spring motor 355 to release its energy effectively.

As the piston assembly 400 is driven in the second direction 450 by the return spring 455, the rack 335 engages the gear system 338 again. The gear system 338 again converts the linear energy of the rack 335 into rotational energy and stores the energy in the spring motor 355. As the piston assembly 400 reaches the low point of its down stroke, another toothless slot 655 (FIG. 6) disposed on the rack 335 disengages the gear system 338 from the rack 335, allowing free rotation. The free rotation of the gear system 338 allows the spring motor 355 to unwind and rotate the drive shaft of the generator 365 to produce electrical power.

Figure 6:
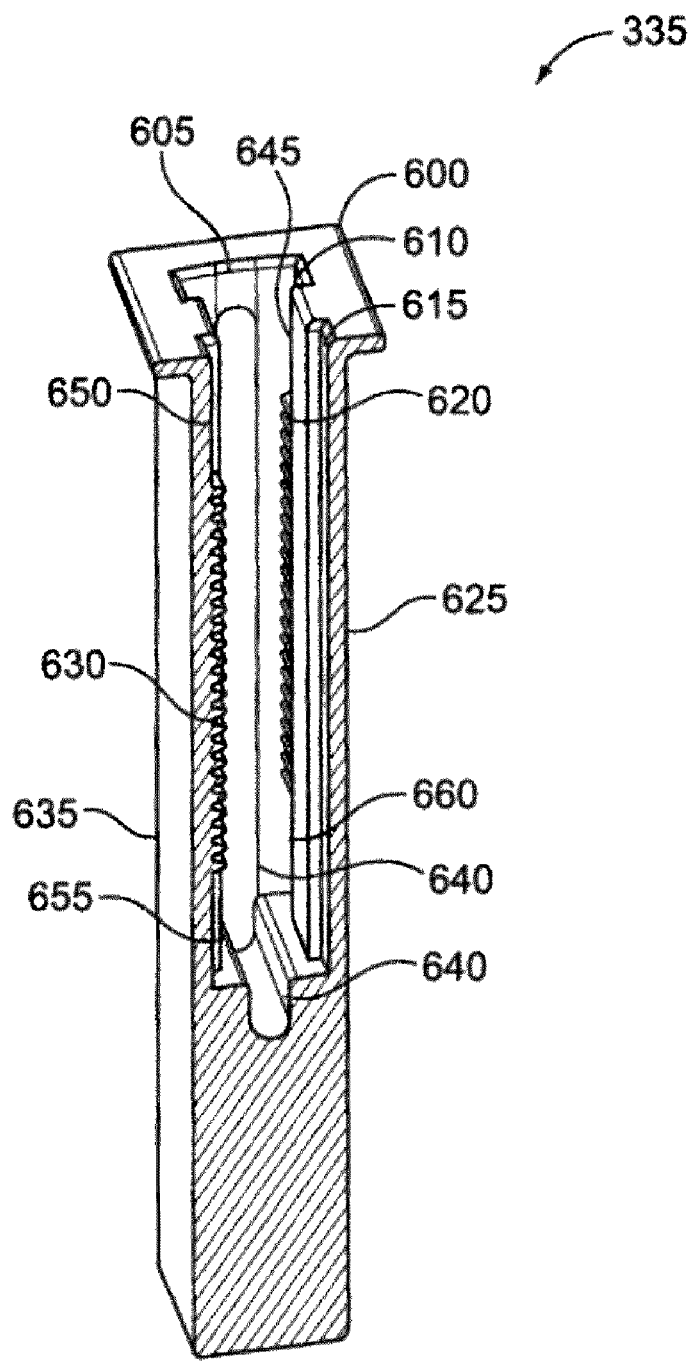
FIG. 6 is a cross section of a rack of the power generation module of FIG. 3 taken along line 6-6 in FIG. 3.

With reference to FIG. 6, the rack 335 has an enlarged top 600, which prevents additional translation of the rack 335 during the downstroke of the piston assembly 400 by resting upon the rack guide 330 of the piston cap 325. As shown, the enlarged top 600 defines an opening 605 therein with two grooves 610, 615 for a dual gear configuration. In the first groove 610, a plurality of teeth 620 are disposed on the interior face of a first side 625 of the rack 335. In the second groove 615, a plurality of teeth 630 are disposed on an interior face on a second side 635 of the rack 335, opposite to the first side 625. Provided between the first and second sides 625, 635 is a track 640, through which the gear system 338 extends. The track 640 allows the rack 335 to translate through the piston cap 325 while the gear system 338 remains stationary and converts the linear energy of the rack 335 to rotational energy.

Disposed below the plurality of teeth 620, 630 on both sides 625, 635 of the rack 335 are toothless slots 645, 650. Additionally, toothless slots 655, 660 are disposed above the plurality of teeth 620, 630. The operation of the rack 335 will be described with reference to FIG. 7 below.

Figure 7:
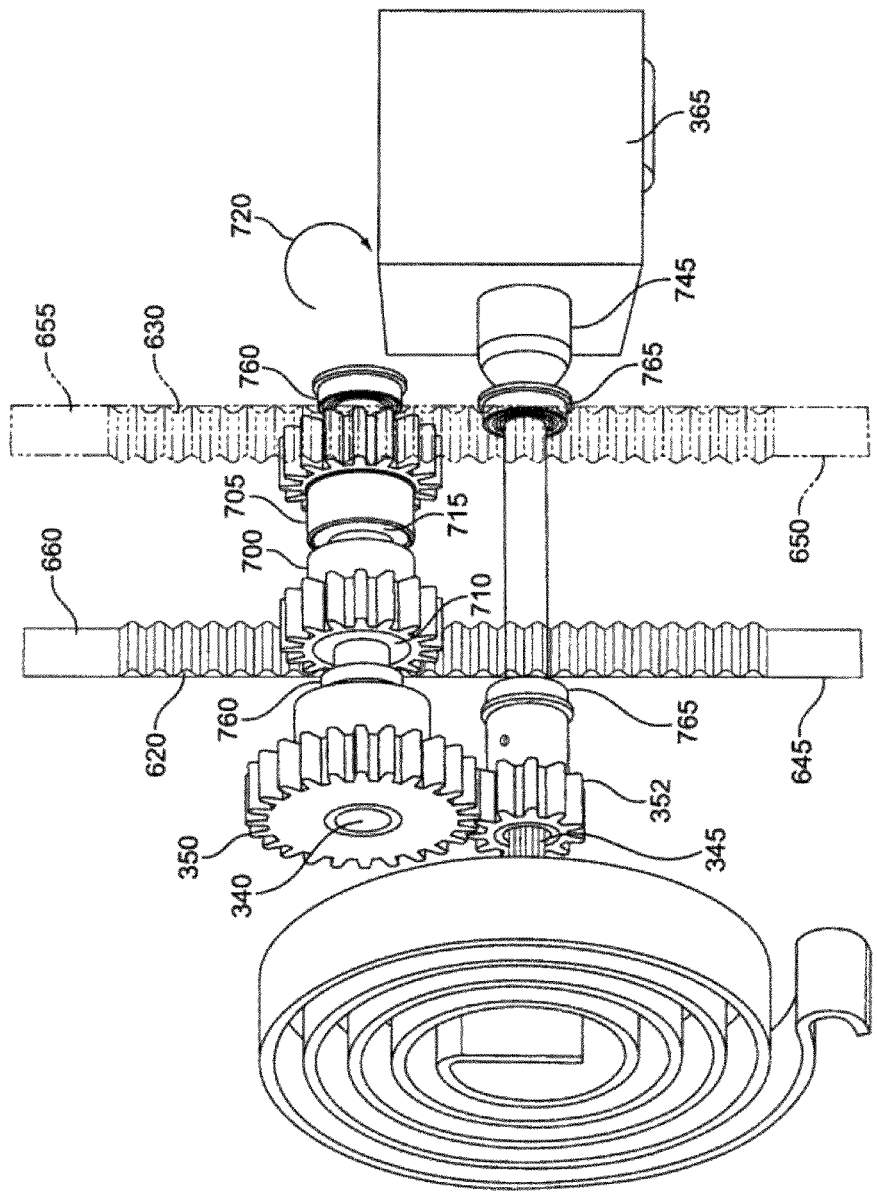
FIG. 7 is a perspective view of a gear system of the example power generation module of FIG. 3.

With reference to FIG. 7, the gear system 338 includes a first clutch gear 700 and a second clutch gear 705 in order to harness the linear energy produced by the piston assembly 400 on both the upstroke and the downstroke, while also rotating the pinion shaft 340 in the same direction. The same direction of rotation allows a simplified setup for the spring motor 355 and for the generator 365. In this configuration, the spring motor 355 is only required to store energy when rotated in a single direction and release the energy in the opposite direction. Likewise, the generator 365 then is driven in a consistent direction to produce energy. Alternatively, one gear could engage one set of teeth on the rack 335 and then the spring motor 355, as well as the generator 365, would have to be configured to operate and produce energy in both directions.

The first and second clutch gears 700, 705 couple to the pinion shaft 340 through a first clutch 710 and a second clutch 715. The first clutch 710 is coupled to the first clutch gear 700 and couples the first clutch gear 700 to the pinion shaft 340 when the piston assembly 400 is driven in the first direction 430 and releases the first clutch gear 700 from the pinion shaft 340 when the piston assembly 400 is driven in the second direction 450. Similarly, the second clutch 715 is coupled to the second clutch gear 705 and couples the second clutch gear 705 to the pinion shaft 340 when the piston assembly 400 is driven in the second direction 450 and releases the second clutch gear 705 from the pinion shaft 340 when the piston assembly 400 is driven in the first direction 430. Alternatively, the first and second clutches 710, 715 could couple to the pinion shaft 340 and couple to and release the first and second clutch gears 700, 705.

When the water flow 110 is turned on, and forces the piston assembly 400 in the first direction 430, the rack 335 translates in the first direction 430 and the plurality of teeth 620 disposed on the rack 335 engage the first clutch gear 700. As the first clutch gear 700 begins to rotate in an operation direction, such as indicated by arrow 720, the first clutch 710 rotates therewith. The gear system 338 can be configured to operate in a direction opposite the operation direction 720 by disposing the plurality of teeth 620, 630 on opposite sides 625, 635 of the rack 335 from their present positions. In this second configuration, the first and second clutches 710, 715 would be configured to couple in the direction opposite the operation direction 720.

As the first clutch 710 rotates in the operation direction 720, the first clutch 710 couples the first clutch gear 700 to the pinion shaft 340 and the pinion shaft 340 is driven in the operation direction 720. The pinion shaft 340 drives the rotation of the pinion 350, which drives the rotation of the motor gear 352 and the motor shaft 345. The rotation of the motor shaft 345 in the operation direction 720 causes the spring motor 355 to store energy. At the same time, a plurality of teeth 630 disposed on the opposite side of the rack 335 also engage the second clutch gear 705. The second clutch gear 705 and the second clutch 715 then begin to rotate in a direction opposite to the operation direction 720. As the second clutch 715 is driven in the direction opposite to the operation direction 720, the pinion shaft 340 uncouples from the second clutch 715 releasing the second clutch gear 705 from the pinion shaft 340. As a result of this uncoupling, the pinion shaft 340 rotates in the operation direction 720 as a result of being coupled to the first clutch 710 and the first clutch gear 700, even though the second clutch gear 705 is driven in the direction opposite the operation direction 720.

The first clutch gear 700 engages the plurality of teeth 625 disposed on the rack 335 as the rack 335 is driven in the first direction 430 and causes the spring motor 355 to store energy until the toothless slot 645 is driven to the first clutch gear 700. The toothless slot 645 disengages the first clutch gear 700 from the rack 335, which allows free rotation of the first clutch gear 700. The second clutch gear 705 is already uncoupled from the pinion shaft 340 by the second clutch 715. Alternatively, the second clutch gear 705 can disengage from the plurality of teeth 630 by being driven to the toothless slot 650, allowing even freer rotation. As the gear system 338 uncouples from the rack 335, the spring motor 355 is allowed to unwind and release its stored energy to drive the motor shaft 345 in the direction opposite to the operation direction 720. A coupler 745 attaches the motor shaft 345 to the generator 365 to rotate the drive shaft of the generator 365 to produce electrical power. The gear system 338 remains disengaged until the water flow 110 is shut off and no longer holds the piston assembly 400 at its peak upstroke position. At this point, the return spring 455 drives the piston assembly 400 in the second direction 450. The rack 335 translates in the second direction 450 and the plurality of teeth 630 engage the second clutch gear 705. As the second clutch 715 rotates in the operation direction 720, the second clutch 715 couples the second clutch gear 705 to the pinion shaft 340 and the pinion shaft 340 is driven in the operation direction 720. The pinion shaft 340 drives the rotation of the pinion 350, which drives the rotation of the motor gear 352 and the motor shaft 345. The rotation of the motor shaft 345 in the operation direction 720 causes the spring motor 355 to wind and store energy.

At the same time, the plurality of teeth 625 also engage the first clutch gear 700. The first clutch gear 700 and the first clutch 710 then begin to rotate in a direction opposite to the operation direction 720. As the first clutch 710 is driven in the direction opposite to the operation direction 720, the pinion shaft 340 uncouples from the first clutch 710 releasing the first clutch gear 700 from the pinion shaft 340. As a result of this uncoupling, the pinion shaft 340 rotates in the operation direction 720 as a result of being coupled to the second clutch 715 and the second clutch gear 705, even though the first clutch gear 700 is driven in the direction opposite the operation direction 720.

The second clutch gear 705 engages the plurality of teeth 630 as the rack 335 is driven in the second direction 450 and causes the spring motor 355 to store energy until the toothless slot 655 is driven to the second clutch gear 705. The toothless slot 655 disengages the second clutch gear 705 from the rack 335, which allows free rotation of the second clutch gear 705. The first clutch gear 700 is already uncoupled from the pinion shaft 340 by the first clutch 710. Alternatively, the first clutch gear 700 can disengage from the plurality of teeth 625 by being driven to the toothless slot 660, allowing free rotation. As the gear system 338 uncouples from the rack 335, the spring motor 355 is allowed to unwind and release its stored energy to drive the motor shaft 345 in the direction opposite to the operation direction 720. The motor shaft 345 rotates the drive shaft of the generator 365 through the coupler 745 to produce electrical power.

By this configuration, the piston module 300 produces electrical power from both the upstroke and the downstroke of the piston assembly 400, while turning the pinion shaft 340 in a consistent direction. By driving the motor shaft 345 in a consistent direction, the spring motor 355 configuration is simplified to store energy in only one direction.

Preferably, the gear system 338 includes two pinion shaft bearings 760 to couple the pinion shaft 340 to the rack guide 330 of the piston cap 325 to facilitate the rotation of the pinion shaft 340. Additionally, the gear system 338 may include two motor shaft bearings 765 to couple the motor shaft 345 to the rack guide 330 of the piston cap 325 to facilitate the rotation of the motor shaft 345. The gear system 338 preferably includes both the pinion shaft bearings 760 and the motor shaft bearings 765. Alternatively, the bearings could be bushings or molded shafts in molded holes.

Figure 8:
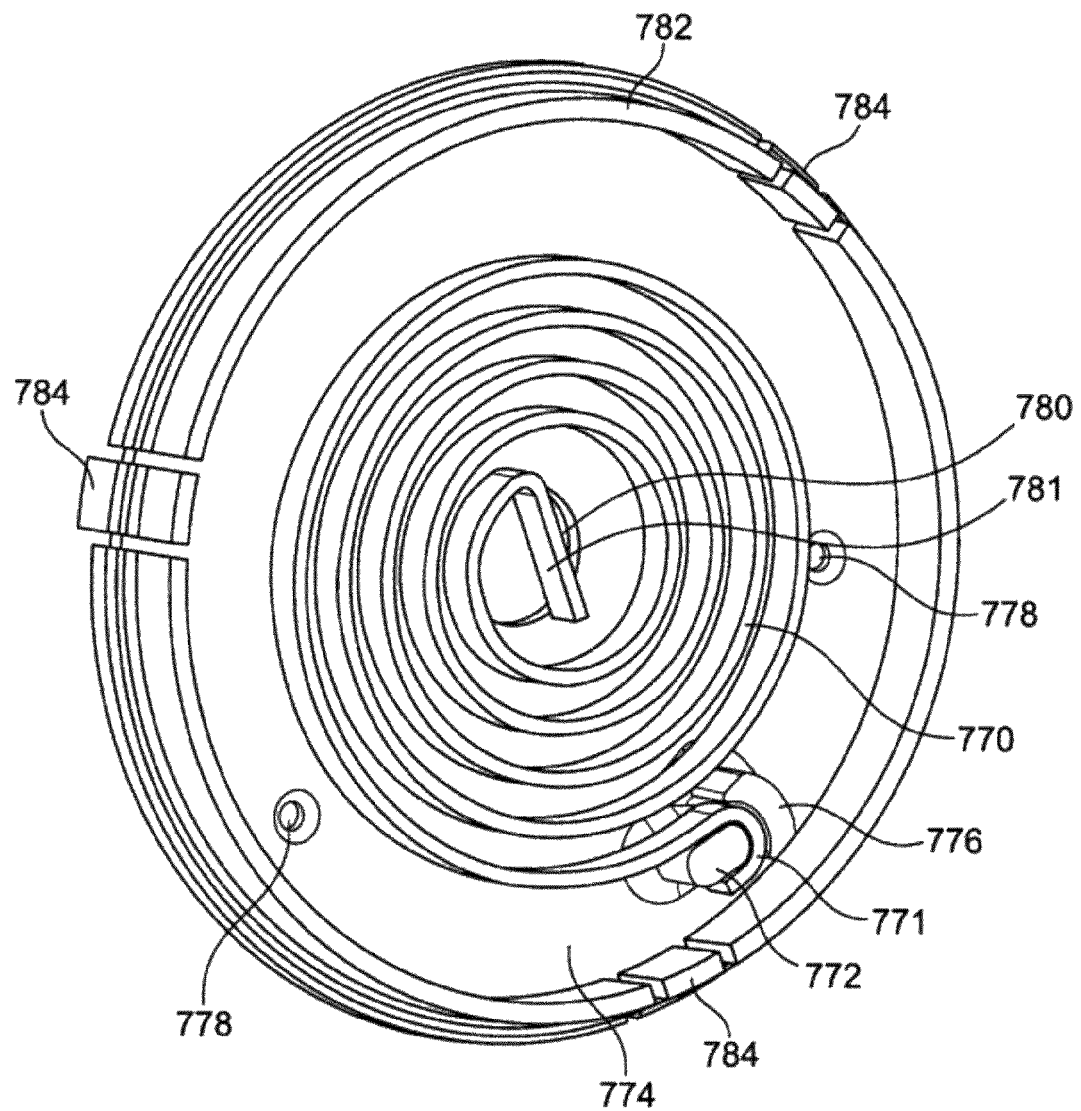
FIG. 8 is a cross section of a spring motor of the power generation module of FIG. 3 taken along line 8-8.

With reference to FIG. 8, the spring motor 355 includes a coil spring 770. A first end 771 of the coil spring 770 engages a stop 772 projecting from a back plate 774. The coil spring 770 is held onto the stop 772 by a securing plate 776. The back plate 774 is secured to the piston cap 325 through screw holes 778. Alternatively, the back plate 774 can secure to the piston cap 325 by other suitable methods, such as by welding, or it may be integrally molded as part of the piston cap 325. The back plate 774 further defines a motor shaft hole 780. The motor shaft hole 780 is disposed in the center of the back plate 774 to allow the motor shaft 345 to extend therethrough and engage the spring coupling 357. The spring coupling 357 then engages spring tang 781 of the coil spring 770 to wind the coil spring 770 to store energy. As the motor shaft 345 is driven by the piston assembly 400, the motor shaft 345 winds the coil spring 770, held in place by the stop 772. Then when the gear system 338 disengages from the rack 335, the coil spring 770 unwinds, driving the motor shaft 345 to produce electricity within the generator 365. Preferably, a cover 782 secures to the back plate 774 by flexible snap-fit prongs 784. Alternatively, the cover 782 can secure to the back plate 774 by other suitable methods, such as adhesive, welding, threading, or hardware.

The piston module 300 can be installed in an irrigation system to convert the hydro energy of the water flow 110 into electrical energy to be stored, such as in a capacitor or by way of charging the electrical energy storage device 120, which can then supply power to the The following chart contains values and calculations based on component testing for a prototype piston module:

| | |
|---|---|
| Water Pressure, p (psi) | 30.00 |
| Bellofram Diaphragm Stroke (in)/Rack # of Teeth | 3.64 |
| Bellofram Effective Area, $A_E$ (in$^2$) | 6.35 |
| Force on motor shaft due to water pressure, $F_w$ (lb) | 190.50 |
| Pinion Pitch Radius, $R_p$ (in)/# of teeth, $N_p$ | 0.25 |
| Drive Gear Pitch Radius, $R_{DG}$ (in) /# of teeth, $N_{DG}$ | 0.50 |
| Roller Clutch Gear Pitch Radius, $R_{CG}$ (in)/# of teeth, $N_{CG}$ | 0.33 |
| # of revolutions of motor shaft | 3.00 |
| # of spring wound motors | 3 |
| Max Torque of Spring wound Motors, T (in-lb) | 1.05 |
| Max Torque on Roller Clutch shaft, $T_{CS}$ (in-lb) | 2.11 |
| Max Resistive force on Rack from spring wound motor, $F_{SM}$ (lb) | 6.31 |
| Minimum Allowable Return Spring Displacement (in) | 2.83 |
| # of Cycles of operation | 1 |
| Energy Generated (J) | 1.30 |

Figure 9:
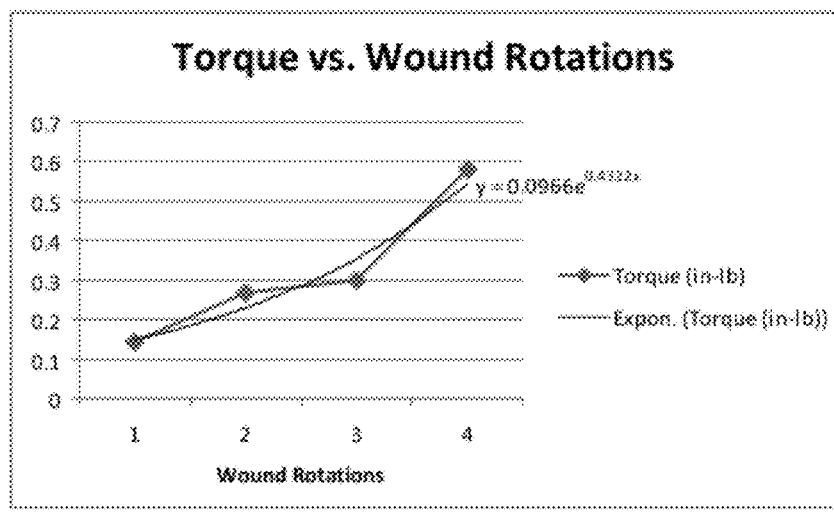
FIG. 9 is a graph showing values measured during testing of a spring wound motor.

The following chart and graph (FIG. 9) shows the torque generated by a particular spring wound motor used for prototyping. A moment arm was connected to the output shaft of a spring wound motor. The moment arm was wound at different revolutions, and the force produced by the moment arm was measured using a digital scale. The force was multiplied by the length of the moment arm to calculate the amount of torque produced for the number of revolutions the motor was wound. Three trials were done for each number of rotations (1-4) in five minute increments to allow the spring to recoil fully.

| Brand | LEGO | | |
|---|---|---|---|
| Moment Arm (in) | 3.28 | | |
| Trial | Force (oz) | Force (lb) | Torque (in-lb) |
| 1 Rotation | | | |
| 1 | 0.28 | 0.0175 | 0.0574 |
| 2 | 0.98 | 0.06125 | 0.2009 |
| 3 | 0.82 | 0.05125 | 0.1681 |
| Average | 0.69 | 0.043 | 0.142 |
| 2 Rotations | | | |
| 1 | 1.06 | 0.06625 | 0.2173 |
| 2 | 1.9 | 0.11875 | 0.3895 |
| 3 | 0.96 | 0.06 | 0.1968 |
| Average | 1.31 | 0.082 | 0.268 |
| 3 Rotations | | | |
| 1 | 1.34 | 0.08375 | 0.2747 |
| 2 | 1.72 | 0.1075 | 0.3526 |
| 3 | 1.3 | 0.08125 | 0.2665 |
| Average | 1.45 | 0.091 | 0.298 |
| 4 Rotations | | | |
| 1 | 2.62 | 0.16375 | 0.5371 |
| 2 | 3.36 | 0.21 | 0.6888 |
| 3 | 2.5 | 0.15625 | 0.5125 |
| Average | 2.83 | 0.177 | 0.579 |

Figure 10:
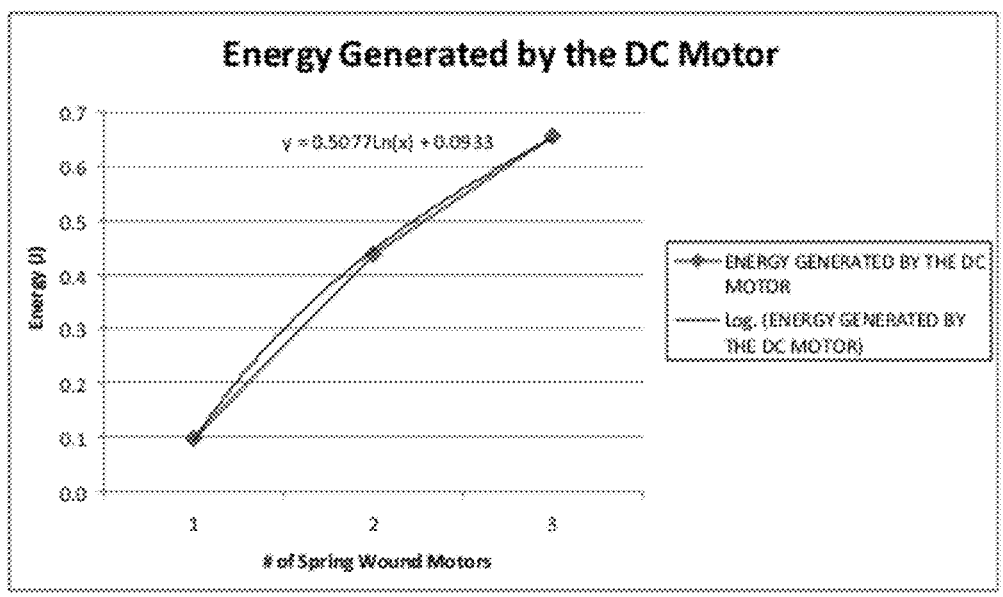
FIG. 10 is a graph showing values measured during testing of a DC motor driven by the spring wound motor of FIG. 9.

The following chart and graph (FIG. 10) shows the energy generated by a DC motor driven by a spring motor. One to three spring wound motors were set up to drive a LEGO 9V DC motor using a 1:1 gear ratio. The DC motor was connected to an electrical circuit consisting of a bridge. The output of the bridge was connected to a Nuon NiMH Rechargeable 9V Battery. A DMM was connected in parallel with the battery to measure the battery voltage prior to each trial. A current probe surrounded the positive lead coming out of the bridge to measure the current. The spring wound motor was wound 3 times and released. The time from when the spring wound motor was released to when it stopped was recorded, as well as the maximum amount of current displayed on the current probe LCD. This process was repeated 3 times for each number of spring wound motors used.

The second spring wound motor was attached to the same shaft as the first spring wound motor. The third spring wound motor was positioned in reverse and on top of the other two spring wound motors. The shaft of the third spring wound motor was connected to the main shaft through a 1:1 gear ratio.

The energy generated from each trial was calculated by multiplying the voltage by the current by the time/2. The time is divided by two because the DC motor did not produce the maximum current for the total time that the spring wound motors were spinning The current increased linearly as the DC motor reached its maximum speed and decreased linearly as the DC motor reduced its speed down to zero.

ENERGY GENERATED BY THE DC MOTOR

| Trial | Voltage (V) | Max Current (A) | Time (s) | Energy Generated (J) |
|---|---|---|---|---|
| 1 Spring Wound Motor | | | | |
| 1 | 9.25 | 0.004 | 3.49 | 0.0646 |
| 2 | 9.25 | 0.006 | 3.77 | 0.1046 |
| 3 | 9.25 | 0.007 | 3.7 | 0.1198 |
| Average | 9.25 | 0.006 | 3.65 | 0.0963 |
| 2 Spring Wound Motors | | | | |
| 1 | 9.25 | 0.033 | 3.42 | 0.5220 |
| 2 | 9.25 | 0.024 | 3.48 | 0.3863 |
| 3 | 9.25 | 0.026 | 3.35 | 0.4028 |
| Average | 9.25 | 0.028 | 3.42 | 0.4370 |
| 3 Spring Wound Motors | | | | |
| 1 | 9.25 | 0.043 | 3.40 | 0.6762 |
| 2 | 9.25 | 0.043 | 3.47 | 0.6901 |
| 3 | 9.25 | 0.037 | 3.52 | 0.6024 |
| Average | 9.25 | 0.041 | 3.46 | 0.6562 |

The following chart shows the return spring characteristics:

| RETURN SPRING CHARACTERISTICS | |
|---|---|
| Free Length (in) | 8 5/8 |
| Inside Diameter (in) | 1.77 |
| Outside Diameter (in) | 1.97 |
| TEST | |
| Initial Height (in) | 8 5/8 |
| Final Height (in) | 7 |
| Force (lb)/(oz) | 3 |
| Force (lb) | 3.625 |
| k value (lb/in) | 2.23 |

Figure 11:
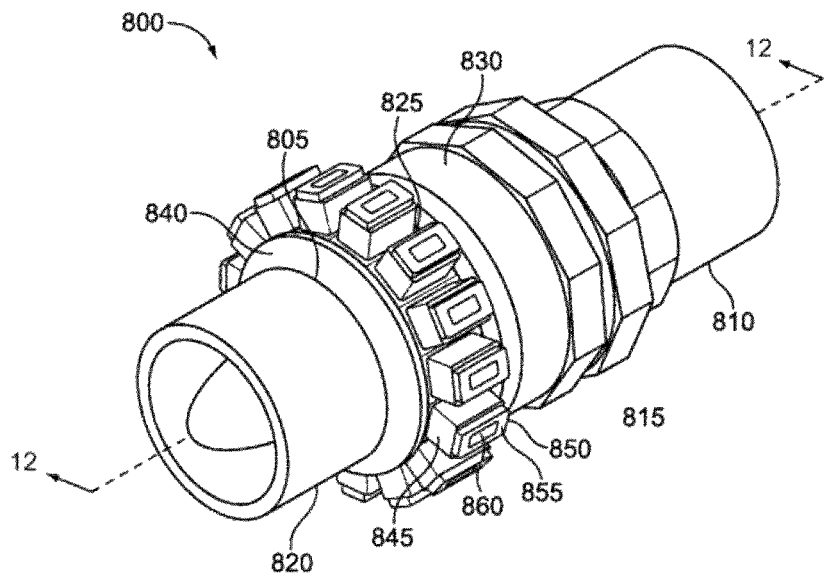
FIG. 11 is a perspective view of another power generation module configured in accordance with various features of the invention.
Figure 12:
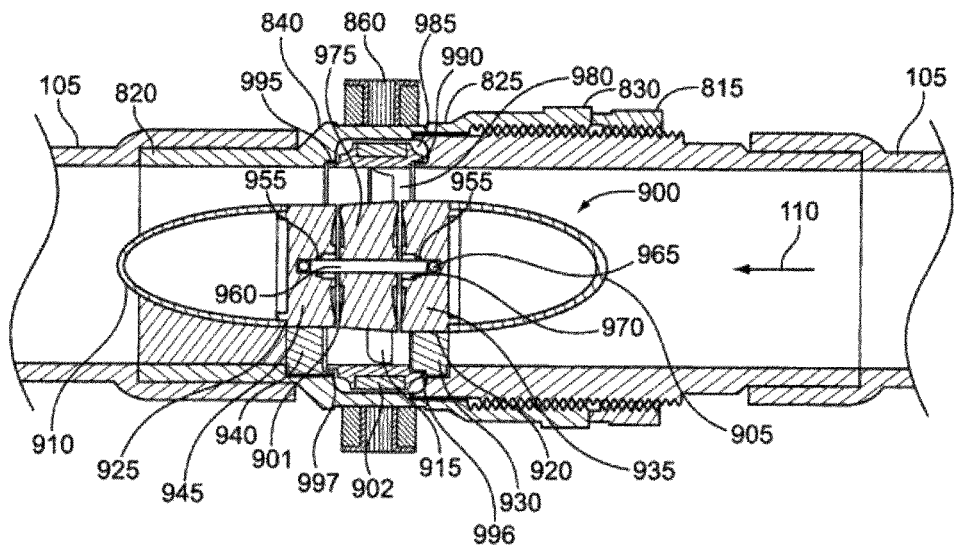
FIG. 12 is a cross section of the power generation module of FIG. 11 taken along line 12-12 in FIG. 11.

Referring now to FIG. 11, the power generation module 100 includes a turbine module 800 that communicates with the water flow 110 in the irrigation conduit 105 to interface with the hydro energy. The turbine module 800 has turbine housing 805 that connects to a threaded coupler 810. The positioning of the turbine housing 805 on the threaded coupler 810 is secured by a lock nut 815. Turbine housing 805 and threaded coupler 810 could be connected by other means including, but not limited to, adhesive, welding, or hardware.

The turbine housing 805 comprises an irrigation conduit and includes an upstream portion 820, an intermediate portion 825 and a downstream portion 830. The upstream portion 820 is a male adapter to couple the turbine module 800 to the irrigation conduit 105. After the upstream portion 820, the turbine housing 805 increases in diameter to provide a base 840 that receives the coupled irrigation conduit 105.

Figure 13:
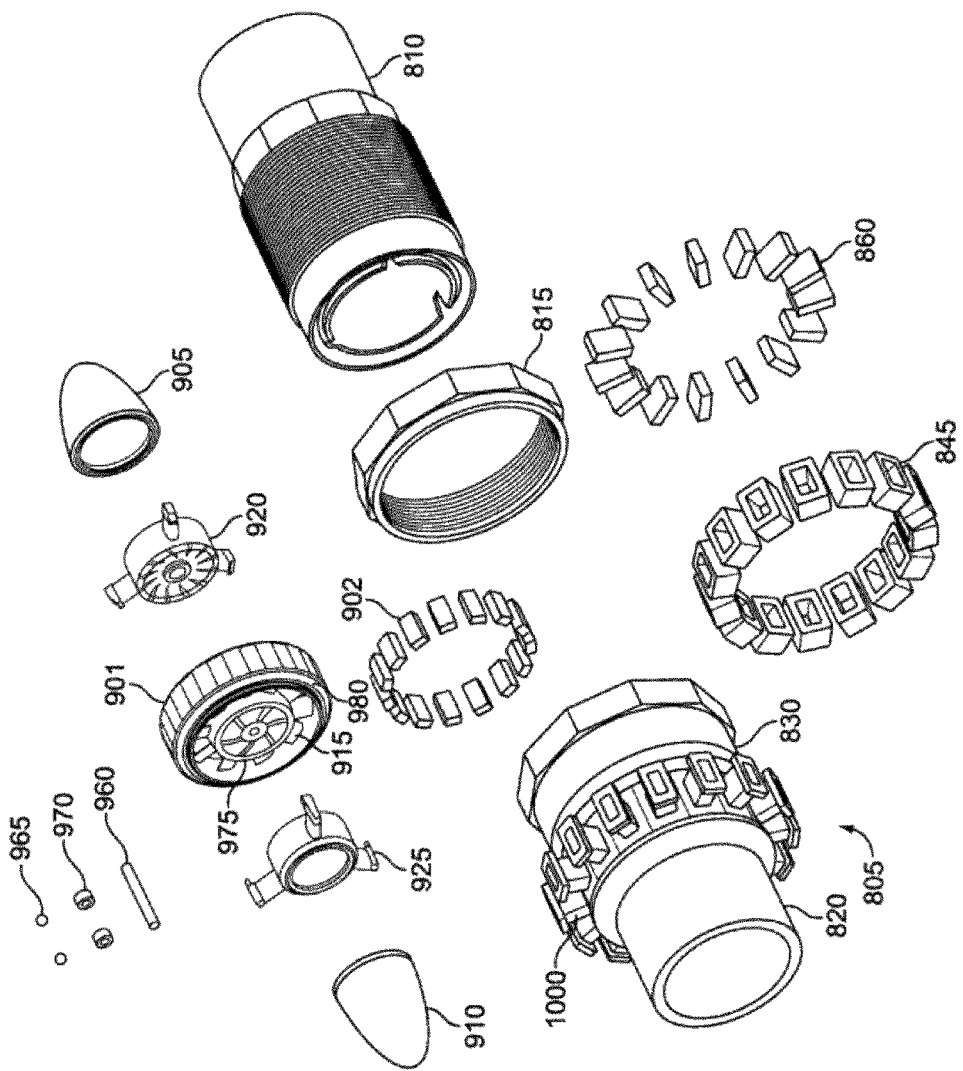
FIG. 13 is an exploded view of the power generation module of FIG. 11.
Figure 14:
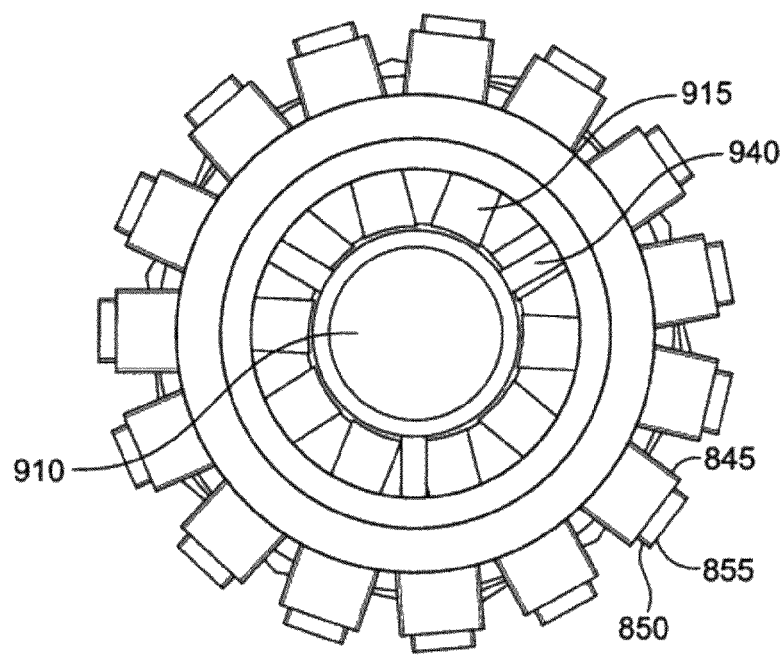
FIG. 14 is a rear elevation view of the power generation module of FIG. 11.
Figure 15:
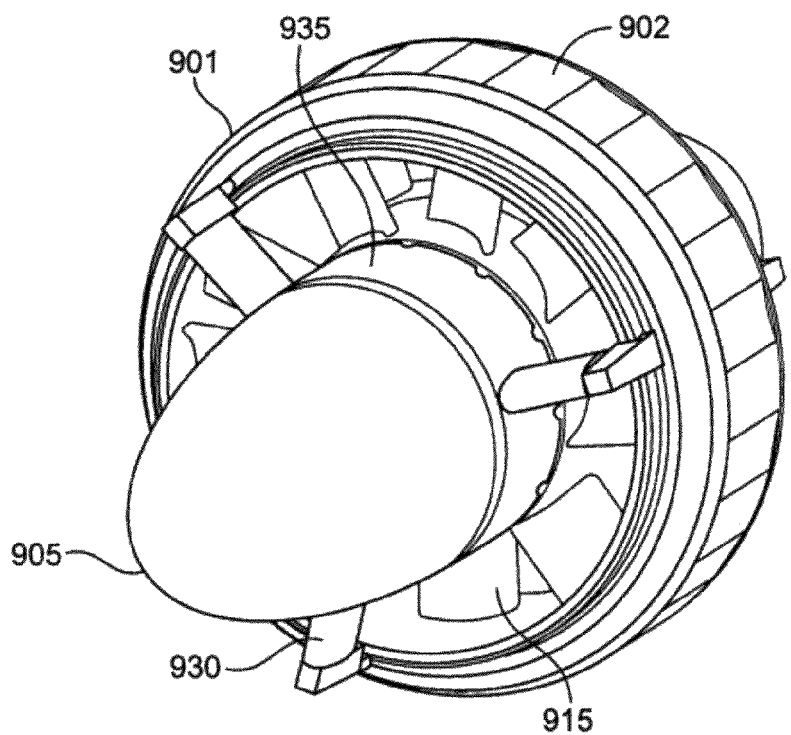
FIG. 15 is a perspective view of the turbine assembly of the power generation module of FIG. 11.

In the intermediate portion 825, the turbine housing includes at least one coil 845, and preferably fifteen coils 845 spaced equidistant about the air side of the turbine housing 805. Each coil 845 is preferably created with insulated copper wire, however, other known conductive materials may be used. Each coil 845 is wrapped around a bobbin 850 projecting radially outward from the turbine housing 805. By another approach, the coils 845 and the bobbins 850 may be assembled separate from the turbine housing 805 and securely attached to the housing 805 by any suitable method, such as by adhesive, welding, interference fit, threading, or hardware. The bobbins 850 each include a stem 1000 (FIG. 13), around which the coil 845 is wound. Each bobbin 850 terminates with an enlarged top 855 that holds the coil 845 on the bobbin 850. As shown in FIG. 11, the coils 845 preferably are mounted outside of the irrigation conduit 105, however, the coils 845 also can be mounted inside of the turbine housing 805. For example, this may be accomplished by mounting the coils 845 to an inner surface of the irrigation conduit 105, or in a cavity disposed inside of the turbine conduit 805.

The bobbins 850 may further include a hollow interior, in which a magnetically conductive core 860 can be inserted. The magnetically conductive core 860 is preferably made of iron and increases the ability of the coil 845 to create voltage when the coil 845 is crossed by a magnetic field.

The upstream portion 830 of the turbine housing 805 increases in diameter over the intermediate portion 825 in order to accommodate internal threading to engage external threading on the threaded coupler 810. Preferably, the inner diameter of the threaded coupler 810 is generally consistent with the inner diameter of the downstream portion 820 and the intermediate portion 825 of the turbine housing 805 to minimize pressure drop through the turbine module 800.

With reference to FIGS. 12-15, the turbine assembly 900 includes a turbine 901 with a series of magnets 902. When the water flow 110 drives the turbine 901 to rotate within the turbine housing 805, the magnets 902 and their magnetic fields rotate as well. As the magnets 902 and their corresponding magnetic fields are driven past the coils 845 located on the outside of the turbine housing 805, the magnets 902 generate a current within the coils 845. The coils 845 are connected to the power conditioning circuit 115 to alter the current making it compatible with the electrical energy storage device 120, such as in a capacitor or a battery. The electrical energy storage device 120 can then supply electricity to the components 125 of the irrigation system.

Additionally, the frequency of the current can be monitored to determine the flow through the turbine 901. The frequency produced by the turbine 901 directly corresponds to the amount of water flow 110 through the turbine 901. By monitoring the frequency of the current, the turbine 901 measures the flow rate of the water flow 110 through the turbine 901 and produces power to supply electricity to the irrigation components 125 at the same time. The flow measurements can be communicated wirelessly back to a controller, and the wireless communication device can be powered by the turbine 901.

More specifically, the turbine assembly 900 includes a forward cone 905 and an aft cone 910. The forward cone 905 restricts the available cross-sectional area of the irrigation conduit 105 in order to increase the velocity of the water flow 110, as well as direct the water flow 110 to a series of blades 915 of the turbine 901. The preferred turbine 901 includes ten blades 915, although this number is dependent on flow conditions.

The forward cone 905 is coupled to a forward strut 920, and the aft cone 910 is coupled to an aft strut 925. The forward strut 920 and the aft strut 925 are mounted to the turbine housing 805 to provide support for the radial loads produced by the turbine assembly 900. Alternatively, the turbine assembly 900 could be supported by only one of the forward strut 920 or the aft strut 925 and the other eliminated.

The forward strut 920 includes a plurality of radial support arms 930 and a center axle hub 935. More specifically, the forward strut 920 includes three radial support arms 930 spaced equally about the hub 935, but is not limited to the number 3. The forward strut 920 attaches to the threaded coupler 810 by any suitable method, such as groove-and-post, welding, or hardware.

Similarly, the aft strut 925 includes a plurality of radial support arms 940 and a center axle hub 945. More specifically, the aft strut 925 includes three radial support arms 940 spaced equally about the hub 945, but is not limited to the number 3. The aft strut 925 can attach to the turbine housing 805 by any suitable method, such as groove-and-post, welding, or hardware.

The center axle hub 935 is spaced from the threaded coupler 810 by the radial support arms 930 and smoothly couples the flow around the forward cone 905 to the flow through the turbine 901. Similarly, the center axle hub 945 is spaced from the turbine housing 805 by the radial support arms 940 and smoothly couples the flow through the turbine 901 to the flow around the aft cone 910. The upstream radial support arms 930 may be angled with respect to the incoming flow to improve turbine efficiency. Likewise, the downstream radial support arms 940 may be angled to straighten the water flow 110 coming out of the turbine 901. Preferably, the center axle hubs 935, 945 have a diameter substantially equal to that of the forward cone 905 and the aft cone 910 where they connect to minimize pressure drop through the piston module 800. The center axle hubs 935, 945 include axle cavities 955 facing the turbine 901 into which an axle 960 is coupled. Preferably, the engagements between the axle cavities 955 and the axle 960 have a small clearance to allow free rotation. The axle cavities 955 also may comprise a spiral grooved hole to provide a place for grit that might get between the surface of the axle 960 and the bearing surface of the axle cavities 955 to drop and not interfere with rotation.

Preferably, the axle cavities 955 house at least one bearing that couples the axle 960 to the forward strut 920 and the aft strut 925. By one approach, the axle cavities 955 house thrust bearings 965 to facilitate rotation of the axle 960 while supporting an axial load. The thrust bearings 965 in this example are ball bearings.

By another approach, the axle cavities 955 house roller bearings 970, and preferably the roller bearings 970 are sealed. The roller bearings 970 also may include a spiral grooved hole on an inside diameter thereof to provide a place for grit in the water flow 110 to drop and be contained if any grit gets into the bearing area. Other bearings that also may be used to facilitate rotation of the axle 960 within the axle cavities 955 include, without limitation, journal bearings and fluid bearings. The axle cavities 955 would house the thrust bearings 965 and the roller bearings 970.

The turbine 901 is rotatably coupled to the axle 960. Preferably, the axle 960 has an interference fit (friction fit) with the turbine 901 in order to tightly secure the turbine 901 onto the axle 960 which is then allowed to freely rotate within the axle cavities 955. Alternatively, the axle 960 can be secured to the turbine 901 by knurl, over-molding, or any number of attachment methods. The turbine 901 includes a hub portion 975 that couples to the axle 960. Preferably, the diameter of the hub portion 975 on each side is substantially equal to the diameter of the center axle hubs 935, 945 in order to minimize pressure drop through the turbine module 800.

The blades 915 extend radially from hub portion 975 to a shroud 980. The magnets 902 are disposed on the shroud 980. This minimizes the distance between the magnets Preferably, the shroud 980 extends to the turbine housing 805 to utilize the full cross-sectional area of the irrigation conduit 105. More preferably, the hub portion 975 and the blades 915 of the turbine 901 are sized to be generally equal to the cross sectional area of the irrigation conduit 105. In this configuration, the shroud 980 begins at the inner diameter of the irrigation conduit 105 and is positioned between the turbine housing 805 and the threaded coupler 810.

More preferably, the engagement between the shroud 980, the turbine housing 805 and the threaded coupler 810 creates a flow discourager 985 arrangement. The flow discourager 985 creates a labyrinthine, high resistance, route for the water flow 110 to travel up and over the shroud 980, which discourages the water flow 110 from using that circuit, instead using the less burdensome path of flowing past this connection and downstream through the conduit. In this configuration, water flow 110 above the shroud 980 is detrimental to the operation of the turbine assembly 900 because less hydro energy is flowing through the turbine 901 and grit in the water flow 110 can inhibit the rotation of the turbine 901. The flow discourager 985 begins with an upstream lip 990 created by an overlap between the shroud 980 and the threaded coupler 810. The shroud 980 extends upstream above the threaded coupler 810 by a small clearance, which requires the water flow 110 to travel outward and then upstream in a restricted area to access the area above the shroud 980. The flow discourager 985 also includes a downstream lip 995 created by an overlap between the shroud 980 and the turbine housing 805. The shroud 980 extends beneath an edge of the turbine housing 805 by a small clearance, which requires the water flow 110 to travel within the restricted area and then inward to enter the irrigation conduit 105. The inertia of flow-borne debris makes it difficult for the debris to make the reversal into the over-the-shroud circuit and, therefore, the debris washes harmlessly downstream.

Additionally, the radial support arms 930 of the forward strut 915 can extend beyond the inner diameter of the irrigation conduit 105 and overlap the threaded coupler 810 to join the flow discourager 985 created by the shroud 980 and the threaded coupler 810. In this configuration, the radial support arms 930 include a downstream lip 996 that extends beneath the shroud 980 recreating the upstream lip 990. This ensures the circumferential continuity of the flow discourager 985 feature. Similarly, the radial support arms 940 of the aft strut 925 can extend beyond the inner diameter of the irrigation conduit 105 and overlap the turbine housing 805 to join the flow discourager 985 created by the shroud 980 and the turbine housing 805. In this configuration, the radial support arms 940 include an upstream lip 997 that extends above the shroud 980 recreating the downstream lip 995. This similarly ensures the circumferential continuity of the flow discourager 985 feature. Preferably, the radial support arms 930, 940 of the forward strut 915 and the aft strut 925 substantially line up, each joining the flow discourager 980 created by the shroud 980, the turbine housing 805, and the threaded coupler 810.

Figure 16:
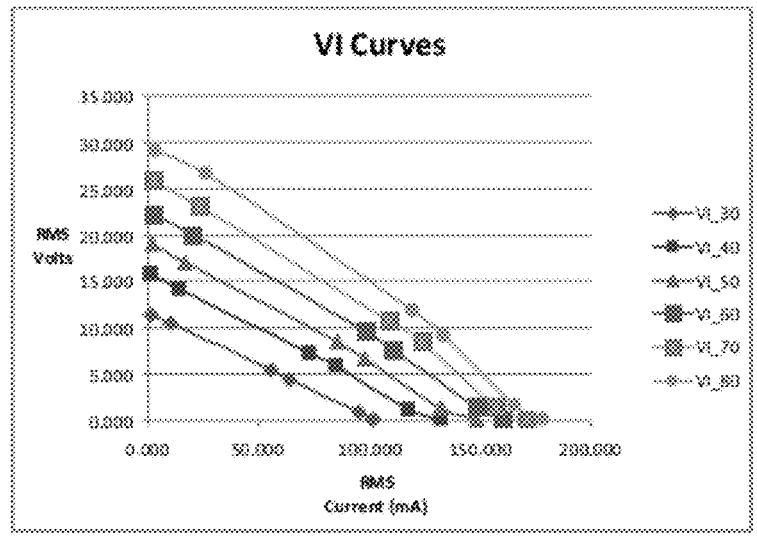
FIG. 16 is a graph showing values measured during testing of the power generation module of FIG. 11 at different flow rates.
Figure 17:
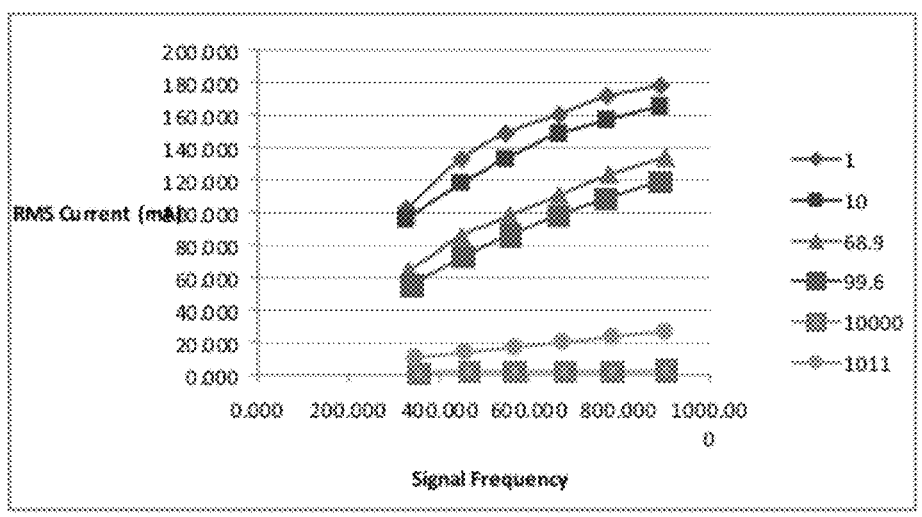
FIG. 17 is a graph showing values measured during testing of the power generation module of FIG. 11 at different flow rates.

The following charts and graphs (FIGS. 16 and 17) show the values measured during testing of a turbine module containing bar magnets at different flow rates. The flow rates tested include 30, 40, 50, 60, 70, and 80 gallons per minute. The loads tested include 1.0, 10.0, 68.9, 99.6, 1011.0, and 10000 Ohms. The voltage output and signal frequencies were measured using an oscilloscope. The resistance was known and the current calculated.

| Flow Rate (GPM) | 1.0 (Ohms) Voltage RMS | 10.0 (Ohms) Voltage RMS | 68.9 (Ohms) Voltage RMS | 99.6 (Ohms) Voltage RMS | 1011.0 (Ohms) Voltage (RMS) | 10000.0 (Ohms) Voltage RMS |
|---|---|---|---|---|---|---|
| 30.0 | 0.102 | 0.955 | 4.419 | 5.515 | 10.465 | 11.455 |
| 40.0 | 0.133 | 1.174 | 5.869 | 7.283 | 14.142 | 15.839 |
| 50.0 | 0.148 | 1.326 | 6.753 | 8.556 | 17.112 | 19.092 |
| 60.0 | 0.160 | 1.485 | 7.637 | 9.758 | 20.082 | 22.203 |
| 70.0 | 0.171 | 1.570 | 8.485 | 10.819 | 23.193 | 25.809 |
| 80.0 | 0.178 | 1.655 | 9.192 | 11.879 | 26.587 | 29.133 |

| Flow Rate (GPM) | 1.0 (Ohms) Current RMS (mA) | 10.0 (Ohms) Current RMS (mA) | 68.9 (Ohms) Current RMS (mA) | 99.6 (Ohms) Current RMS (mA) | 1011.0 (Ohms) Current RMS (mA) | 10000.0 (Ohms) Current RMS (mA) |
|---|---|---|---|---|---|---|
| 30.0 | 101.823 | 95.459 | 64.142 | 55.376 | 10.351 | 1.146 |
| 40.0 | 132.583 | 117.380 | 85.181 | 73.124 | 13.988 | 1.584 |
| 50.0 | 148.492 | 132.583 | 98.010 | 85.904 | 16.926 | 1.909 |
| 60.0 | 159.806 | 148.492 | 110.838 | 97.973 | 19.863 | 2.220 |
| 70.0 | 171.120 | 156.978 | 123.154 | 108.622 | 22.941 | 2.581 |
| 80.0 | 178.191 | 165.463 | 133.416 | 119.271 | 26.298 | 2.913 |

| Flow Rate (GPM) | 1.0 (Ohms) Sig. Freq. (Hz) | 10.0 (Ohms) Sig. Freq. (Hz) | 68.9 (Ohms) Sig. Freq. (Hz) | 99.6 (Ohms) Sig. Freq. (Hz) | 1011.0 (Ohms) Sig. Freq. (Hz) | 10000.0 (Ohms) Sig. Freq. (Hz) |
|---|---|---|---|---|---|---|
| 30.0 | 330.000 | 330.000 | 335.000 | 340.000 | 350.000 | 355.000 |
| 40.0 | 450.000 | 450.000 | 451.000 | 455.000 | 460.000 | 467.000 |
| 50.0 | 550.000 | 550.000 | 555.000 | 555.000 | 570.000 | 570.000 |
| 60.0 | 665.000 | 665.000 | 665.000 | 662.000 | 675.000 | 677.000 |
| 70.0 | 774.000 | 774.000 | 775.000 | 770.000 | 785.000 | 785.000 |
| 80.0 | 892.000 | 892.000 | 900.000 | 892.000 | 900.000 | 900.000 |

Figure 18:
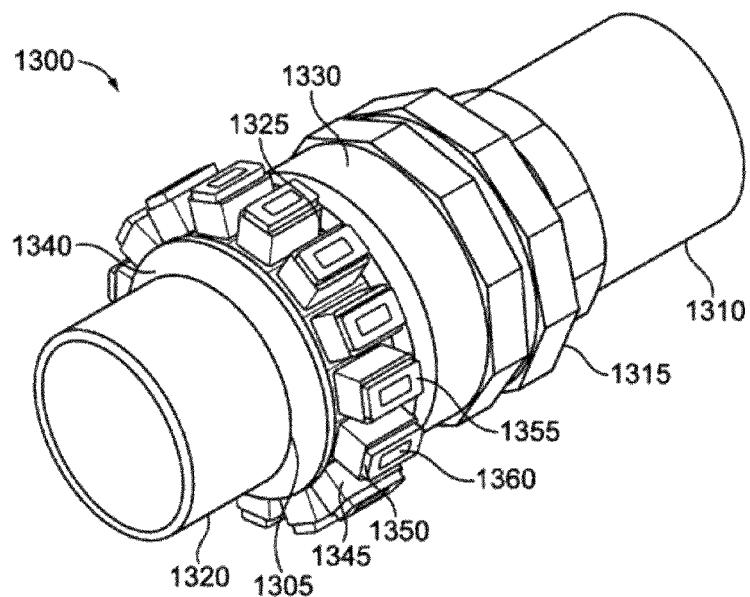
FIG. 18 is a perspective view of another power generation module configured in accordance with various features of the invention.
Figure 19:
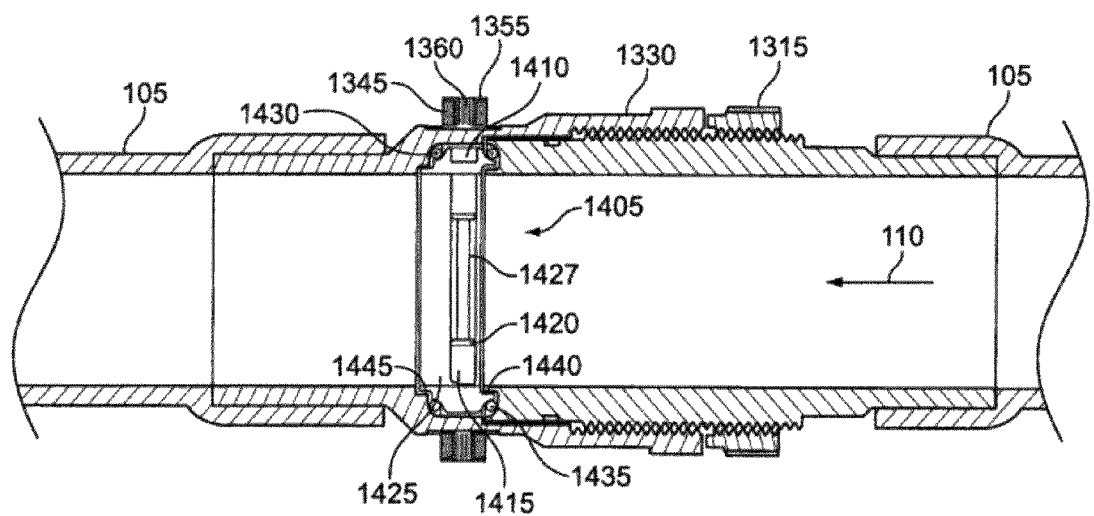
FIG. 19 is a cross section of the power generation module of FIG. 18.

Referring now to FIG. 18, the power generation module 100 includes a turbine module 1300 that communicates with the water flow 110 in the irrigation conduit 105 to interface with the hydro energy. The turbine module 1300 has a turbine housing 1305 that connects to a threaded coupler 1310. The positioning of the turbine housing 1305 on the threaded coupler 1310 is secured by a lock nut 1315.

The turbine housing 1305 comprises an irrigation conduit and includes an upstream portion 1320, an intermediate portion 1325 and a downstream portion 1330. The upstream portion 1320 is a male adapter to couple the turbine module 1300 to the irrigation conduit 105. After the upstream portion 1320, the turbine housing 1305 increases in diameter to provide a base 1340 that receives the coupled irrigation conduit 105.

Figure 20:
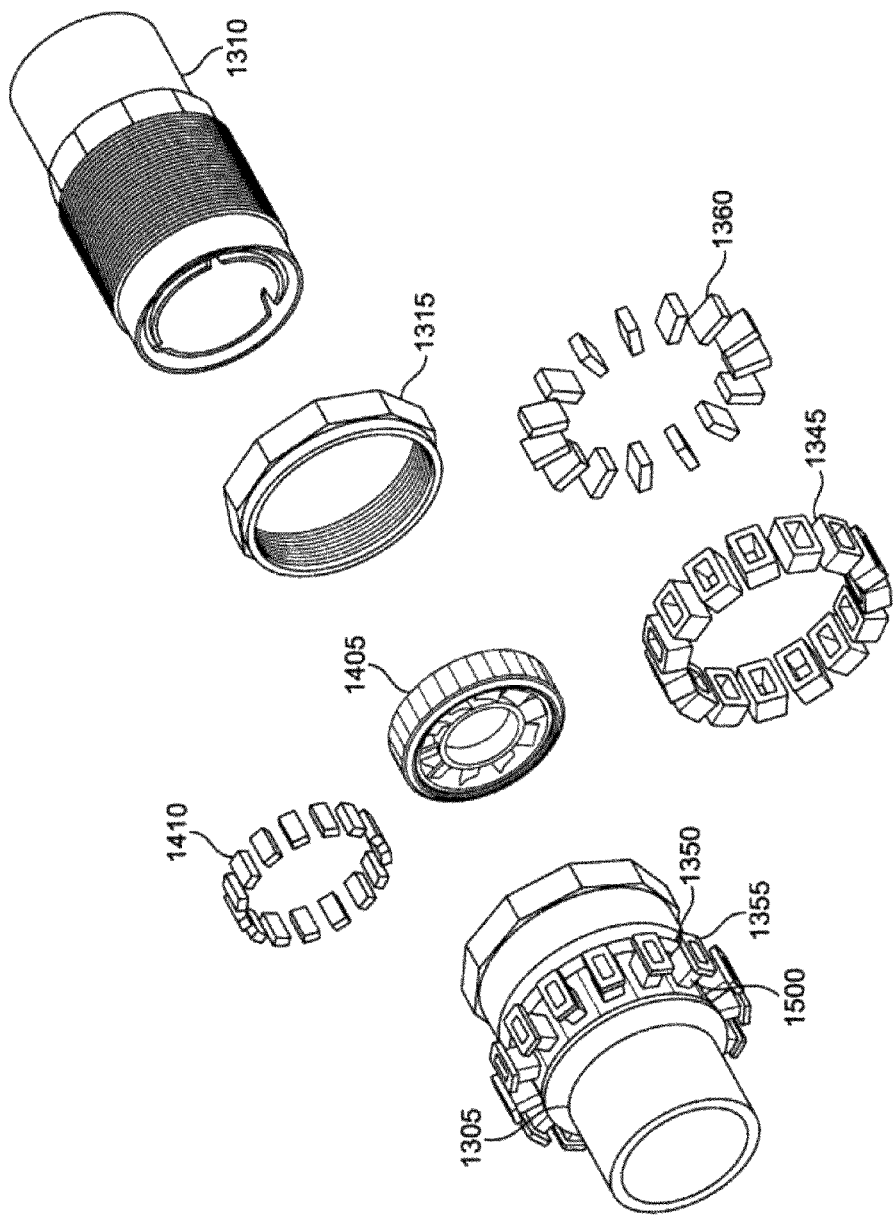
FIG. 20 is an exploded view of the power generation module of FIG. 18.
Figure 21:
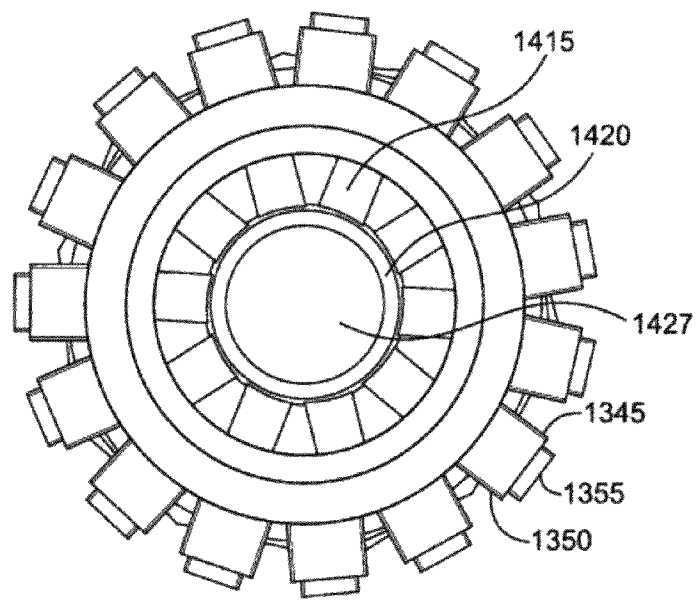
FIG. 21 is a rear elevation view of the power generation module of FIG. 18.
Figure 22:
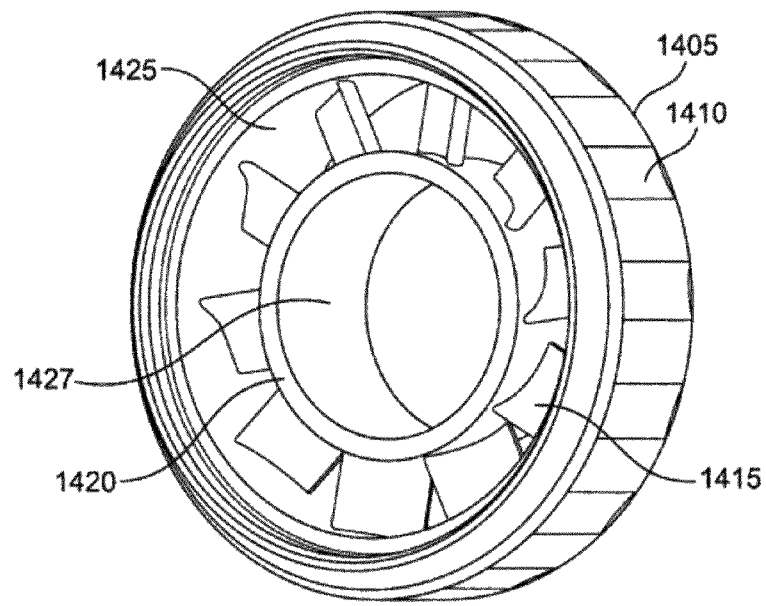
FIG. 22 is a perspective view of the turbine assembly of the power generation module of FIG. 18.

At the intermediate portion 1325, the turbine housing 1305 includes at least one coil 1345, and preferably fifteen coils 1345 spaced equidistant about the air side of the turbine housing 1305. Each coil 1345 is preferably created with insulated copper wire; however, other known conductive materials may be used. Each coil 1345 is wrapped around a bobbin 1350 projecting radially outward from the turbine housing 1305. By another approach, the coils 1345 and the bobbins 1350 may be assembled separate from the turbine housing 1305 and securely attached to the turbine housing 1305 by any suitable method, such as by adhesive, welding, interference fit, threading, or hardware. The bobbins 1350 each include a stem 1500 (FIG. 20), around which the coil 1345 is wound. Each bobbin 1350 terminates with an enlarged top 1355 that holds the coil 1345 on the bobbin 1350. As shown in FIG. 18, the coils 1345 preferably are mounted outside of the irrigation conduit 105. Alternatively, the coils 1345 also can be mounted inside of the turbine housing 1305. For example, this may be accomplished by mounting the coils 1345 to an inner surface of the turbine housing 1305, or in a cavity defined by the inside of the turbine housing 1305.

The bobbins 1350 may define a hollow interior in which a magnetically conductive core 1360 can be inserted. The magnetically conductive core 1360 is preferably made of iron and increases the ability of the coil 1345 to create voltage when the coil 1345 is crossed by a magnetic field.

The upstream end 1330 of the turbine housing 1305 increases in diameter over the intermediate portion 1325 in order to accommodate internal threading to engage the external threading on the threaded coupler 1310. Preferably, the inner diameter of the threaded coupler 1310 is generally consistent with the inner diameter of the downstream portion 1320 and the intermediate portion 1325 of the turbine housing 1305 to minimize pressure drop through the turbine module 1300.

With reference to FIGS. 19-22, a turbine assembly 1400 includes a turbine 1405 with a series of magnets 1410. When the water flow 110 drives the turbine 1405 to rotate within the turbine housing 1305, the magnets 1410 and their magnetic fields rotate as well. As the magnets 1410 and their corresponding magnetic fields are driven past the coils 1345 located on the outside of the turbine housing 1305, the magnets 1410 generate an electric field and, therefore, a current within the coils 1345. The coils 1345 are connected to the power conditioning circuit 115 to alter the current into electrical energy capable of being stored, such as in a capacitor or by charging the electrical energy storage device 120. The capacitor or the electrical energy storage device 120, for example, can then supply, as required, electricity to the components 125 of the irrigation system.

Additionally, the frequency of the current can be monitored to determine the flow through the turbine 1405. The frequency produced by the turbine 1405 directly corresponds to the amount of water flow 110 through the turbine 1405. By monitoring the frequency of the current, the turbine 1405 measures the flow rate of the water flow 110 through the turbine 1405 and produces power to supply electricity to the irrigation components 125 at the same time. The flow measurements can be communicated wirelessly back to a controller, and the wireless communication device can be powered by the turbine 1405.

More specifically, the turbine 1405 includes a series of blades 1415, such as ten blades 1415 spaced equidistant about the turbine 1405. The blades 1415 extend radially from a hub portion 1420 to a shroud 1425. This minimizes the distance between the magnets 1410 and the coils 1345. Preferably, the magnets 1410 are mounted to an outer periphery of the shroud 1425 to rotate within the irrigation conduit 105. The shroud 1425 interlocks with the blades 1415 and increases damping, which reduces blade flutter. The hub portion 1420 defines a center hole 1427.

The shroud 1425 extends to the turbine housing 1305 to utilize the full cross-sectional area of the irrigation conduit 105. Preferably, the hub portion 1420 and the blades 1415 of the turbine 1405 are sized to be generally equal to the cross sectional area of the irrigation conduit 105. In this configuration, the shroud 1425 begins at the inner diameter of the irrigation conduit 105 and is positioned between the turbine housing 1305 and the threaded coupler 1310. More preferably, the turbine assembly 1400 includes at least one bearing 1430 positioned between the shroud 1425 and the turbine housing 1305 and the threaded coupler 1310 to facilitate the rotation of the turbine 1405.

Preferably, the engagement between the shroud 1425, the turbine housing 1305 and the threaded coupler 1310 creates a flow discourager 1435 arrangement. The flow discourager 1435 creates a labyrinthine, high resistance route for the water flow 110 to travel up and over the shroud 1425, which discourages the water flow 110 from using that circuit, instead using the less burdensome path of flowing past this connection and downstream through the conduit. In this configuration, water flow 110 above the shroud 1425 is detrimental to the operation of the turbine assembly 1400 because less hydro energy is flowing through the turbine 1405 and grit in the water flow 110 can inhibit the rotation of the turbine 1405. The flow discourager 1435 begins with an upstream lip 1440 created by an overlap between the shroud 1425 and the threaded coupler 1310. The shroud 1425 extends upstream above the threaded coupler 1310 by a small clearance, which requires the water flow 110 to travel outward and then upstream in a restricted area to access the area above the shroud 1425. The flow discourager also includes a downstream lip 1445 created by an overlap between the shroud 1425 and the turbine housing 1305. The shroud 1425 extends beneath an edge of the turbine housing 1305 by a small clearance, which requires the water flow 110 to travel within the restricted area and then inward to enter the irrigation conduit 105. The inertia of flow-borne debris makes it difficult for the debris to make the reversal into the over-the-shroud circuit and, therefore, the debris washes harmlessly downstream.

Figure 23:
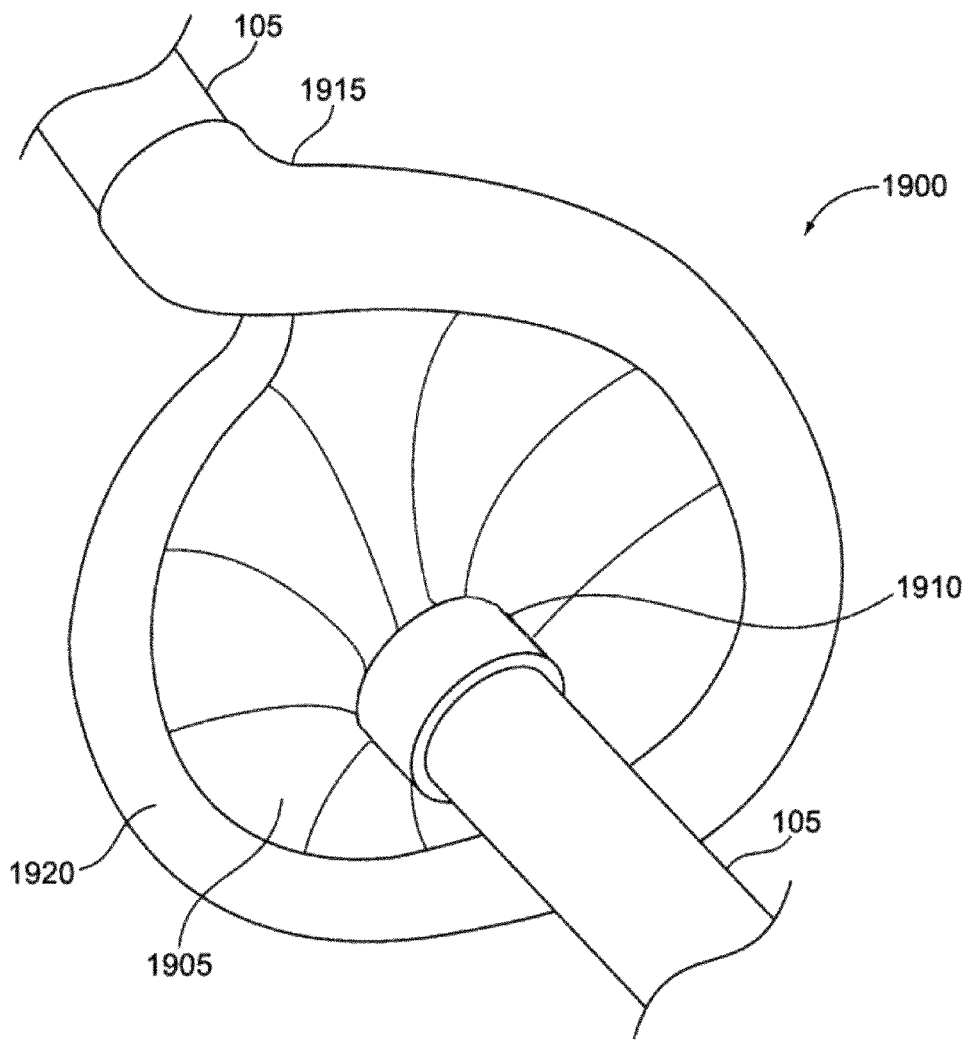
FIG. 23 is a perspective view of another power generation module configured in accordance with various features of the invention.

Referring now to FIG. 23, the power generation module 100 includes a radial turbine module 1900 that communicates with the water flow 110 in the irrigation conduit 105 to interface with the hydro energy. The radial turbine module 1900 has a turbine housing 1905 with an inlet 1910 and an outlet 1915. The turbine housing 1905 includes a scroll 1920 that channels the water flow to the outlet 1915. The scroll 1920 begins with a first cross sectional area and extends entirely around the outer periphery of the turbine housing 1905 with an increasing cross sectional area, ultimately connecting to the irrigation conduit 105 at the outlet 1915, which preferably has an inner diameter generally consistent with the irrigation conduit 105 in order to minimize pressure drop through the connection.

Figure 24:
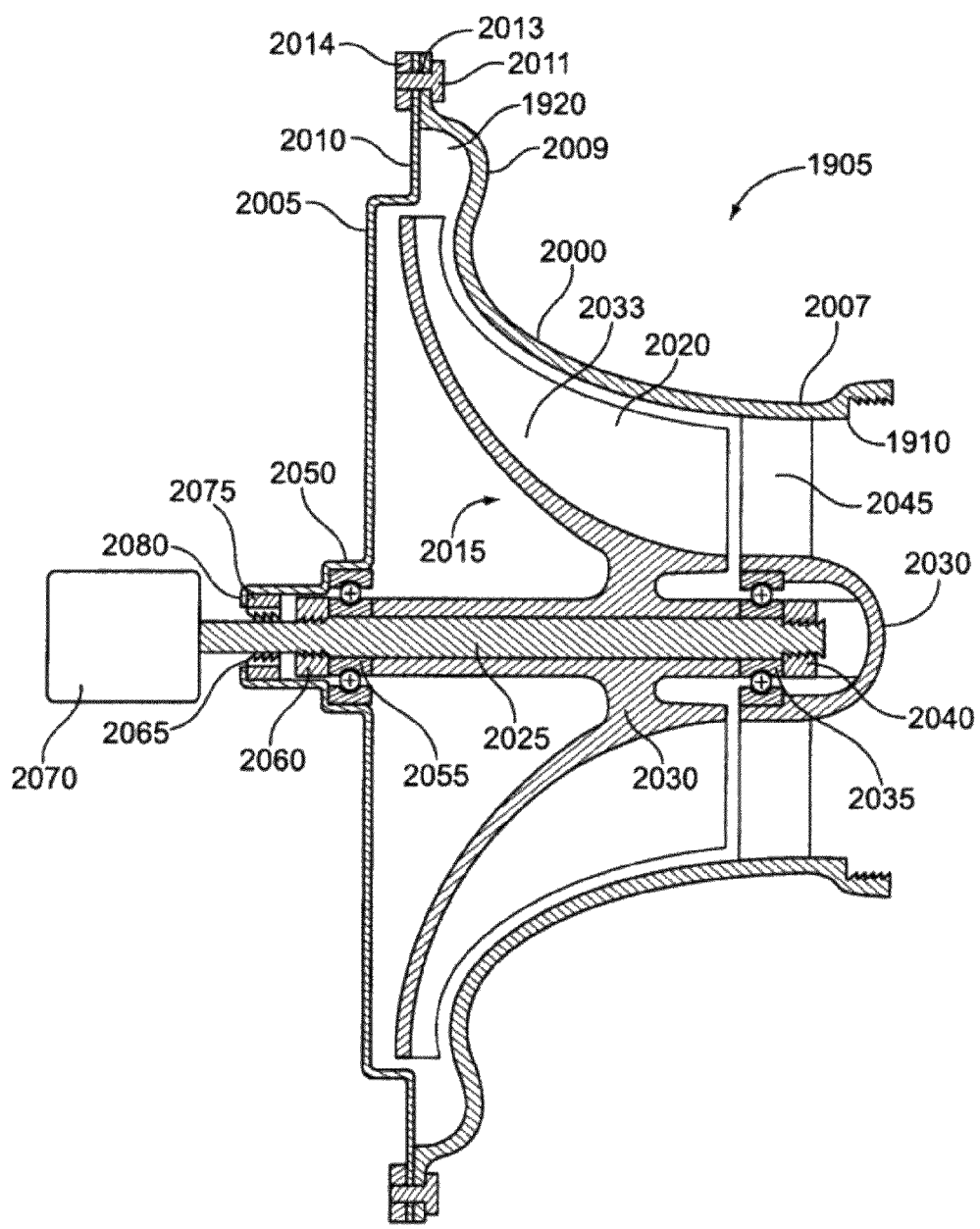
FIG. 24 is a cross section of a first embodiment of the power generation module of FIG. 23.

With reference to FIG. 24, the turbine housing 1905 includes a generally bell-shaped forward wall 2000 and an aft wall 2005. An upstream portion 2007 of the forward wall 2000 increases in diameter in order to accommodate internal threading to engage external threading on the irrigation conduit 105. Preferably, the inlet 1910 has an inner diameter generally consistent with the inner diameter of the irrigation conduit 105 in order to minimize pressure drop through the connection. An outer edge 2009 of the forward wall 2000 combines with an outer edge 2010 of the aft wall 2005 to form the scroll 1920. The outer edge 2009 of the forward wall extends away from the outer edge 2010 of the aft wall 2005 to increase the cross sectional area of the scroll 1920 as the scroll 1920 extends around the outer periphery of the turbine housing 1905.

Preferably, the forward wall 2000 and the aft wall 2005 secure together by at least one screw 2011 inserted into at least one screw hole 2013 and tightened onto at least one nut 2014. Preferably, the forward wall 2000 and the aft wall 2005 secure together by a series of screws 2011 and nuts 2014, such as in a range of four to ten, spaced equidistant around the forward wall 2000 and the aft wall 2005. Alternatively, the forward wall 2000 and the aft wall 2005 can secure together by other suitable methods, such as by adhesive, welding, or threading.

A turbine 2015 is housed within the turbine housing 1905 and includes a series of blades 2020, and preferably in a range of ten to fifteen blades 2020. The blades 2015 are spaced from an axle 2025 by a stem 2030. A turbine surface 2033 curves radially outwardly and directs the water flow 110 radially outwardly to the scroll 1920. The distance between the forward wall 2000 and the turbine surface 2033 is reduced as the water flow 110 proceeds through the turbine to keep the flow area the same as the flow proceeds outward radially. This is done to prevent energy loss due to unnecessary acceleration and deceleration of the flow. More preferably, the turbine surface 2033 substantially lines up with the edge 2010 of the aft wall 2005 to minimize turbulent flow as the water is transferred from the turbine surface 2033 to the scroll 1920. The aft wall 2005 then extends downstream to accommodate the blades 2020.

The axle 2025 extends through the center of the turbine housing 1905 and couples to a nose cone 2030 at its forward end. The nose cone 2030 provides the axle 2025 a small clearance to allow for free rotation. Preferably, at least one bearing 2035 couples the axle 2025 to the nose cone 2030. The bearing 2035 may comprise a roller bearing, which may be sealed. A nut 2040 secures the bearing 2035 in place. The nut 2040 is tightened onto external threading on the forward end of the axle 2025.

The nose cone 2030 is supported within the inlet 1910 and directs the water flow 110 to the blades 2020. Preferably, the downstream diameter of the nose cone 2030 substantially aligns with the turbine surface 2033 to minimize turbulent flow and maximize the amount of water flow 110 impacting the blades 2020. The nose cone 2030 is supported within the center of the inlet 1910 by a plurality of radial support arms 2045, and preferably in a range of two to eight radial support arms 2045. The radial support arms may be angled with respect to the flow to effect an inlet flow angle for improving turbine efficiency.

The axle 2025 couples to the aft wall 2005 at its downstream end. The aft wall 2005 extends downstream to provide a coupling surface 2050 for the axle 2025. The coupling surface 2050 provides a small clearance to allow the axle 2025 to freely rotate. Preferably, at least one bearing 2055 couples the axle 2030 to the coupling surface 2050 of the aft wall 2005. The bearing 2055 may comprise a roller bearing, which may be sealed. More preferably, the bearing 2055 includes a spiral grooved hole on an inside diameter thereof to provide a place for grit in the water flow 110 to drop and be contained if any grit gets into the bearing area. A nut 2060 secures the bearing 2055 in place. The nut 2060 is tightened onto external threading on the forward end of the axle 2025.

By one approach, as shown in FIG. 24, the aft wall 2005 forms an axle hole 2065 through which the axle 2025 extends and couples to a generator 2070. Preferably, a seal 2075 extending to a lip 2080 formed by the aft wall 2005 engages the axle 2025 to create a water tight seal. So configured, when the water flow 110 is turned on and flows through the irrigation conduit 105, it is directed to the blades 2020 by the nose cone 2030. The hydro energy of the water flow 110 forces the blades 2020 to rotate as the water is directed to the scroll 1920 by the turbine surface 2033. The blades 2020 then rotate the axle 2025, which drives the generator 2070 to generate electricity.

The radial turbine module 1900 can be installed in an irrigation system to convert the hydro energy of the water flow 110 into electrical energy to be stored in the electrical energy storage device 120, such as in a capacitor or by way of charging a battery, which can then supply power to the irrigation components 125. For example, the radial turbine module 1900 can be installed downstream and proximate to a valve, and the electrical energy storage device 120 can supply power to a solenoid controlling the opening of the valve. Thus, when the module 1900 turns on the valve, it also begins to produce energy from the flow through the valve to the module 1900. The radial turbine module 1900 also may be located near wireless communication devices, sensors, and controllers to supply such with electricity.

Additionally, the frequency of the current can be monitored to determine the flow through the turbine 2015. The frequency produced by the turbine 2015 directly corresponds to the amount of water flow 110 through the turbine 2015. By monitoring the frequency of the current, the turbine 2015 measures the flow rate of the water flow 110 through the turbine 2015 and produces power to supply electricity to the irrigation components 125 at the same time. The flow measurements can be communicated wirelessly back to a controller, and the wireless communication device can be powered by the turbine 2015.

Figure 25:
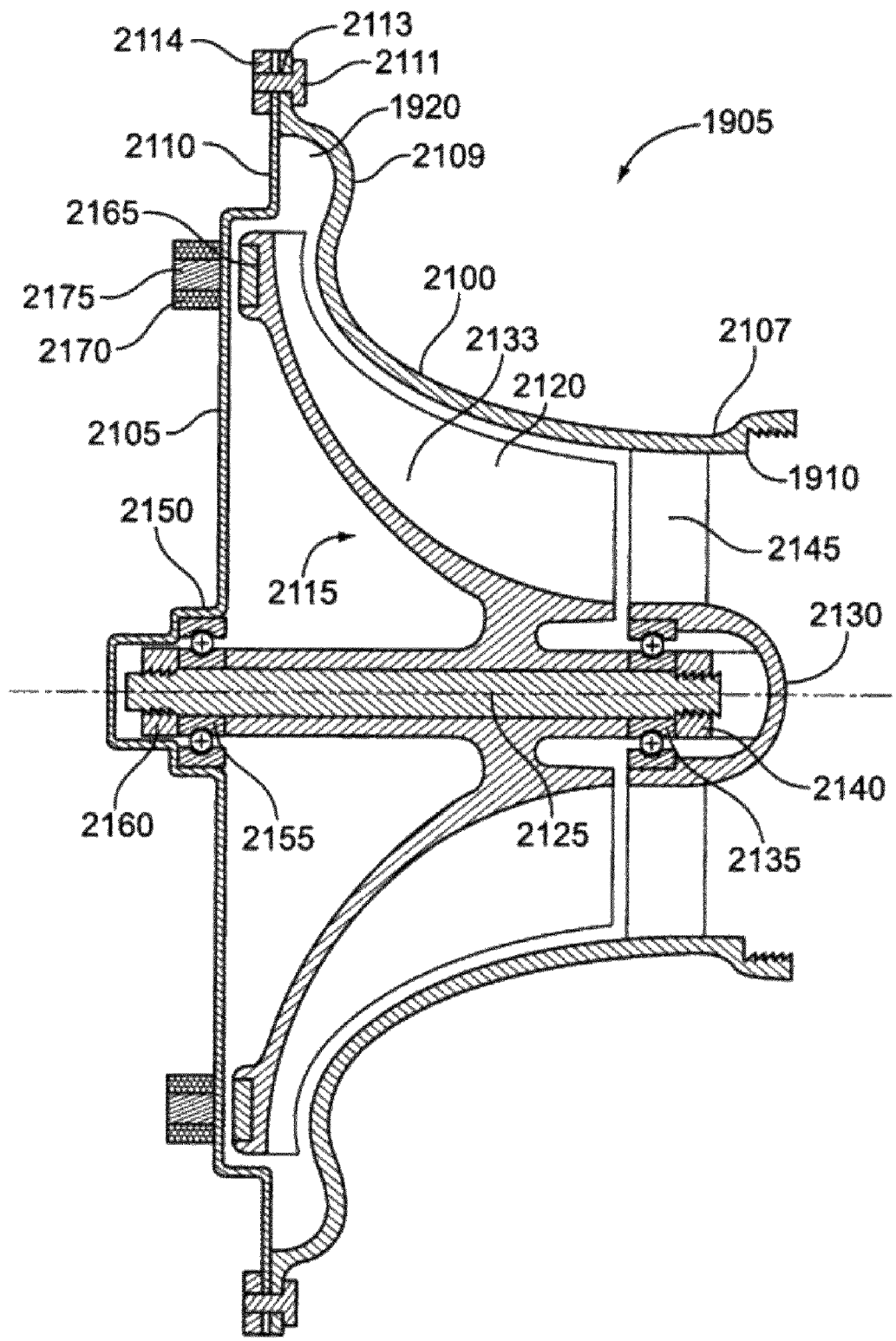
FIG. 25 is a cross section of a second embodiment of the power generation module of FIG. 23.

With reference to FIG. 25, the turbine housing 1905 includes a generally bell-shaped forward wall 2100 and an aft wall 2105. An upstream portion 2107 of the forward wall 2100 increases in diameter in order to accommodate internal threading to engage external threading on the irrigation conduit 105. Preferably, the inlet 1910 has an inner diameter generally consistent with the inner diameter of the irrigation conduit 105 in order to minimize pressure drop through the connection. A radially outer portion 2109 of the forward wall 2100 combines with a radially outer portion 2110 of the aft wall 2105 to form the scroll 1920. The outer portion 2109 of the forward wall 2109 extends away from the outer portion 2110 of the aft wall 2105 to increase the cross sectional area of the scroll 1920 as the scroll 1920 extends around the outer periphery of the turbine housing 1905 from the beginning of the scroll 1920 to the outlet 1915.

Preferably, the forward wall 2100 and the aft wall 2105 secure together by at least one screw 2111 inserted into at least one screw hole 2113 and tightened onto at least one nut 2114. Preferably, the forward wall 2100 and the aft wall 2105 secure together by a series of screws 2111 and nuts 2114, such as in a range of four to ten, spaced equidistant around the forward wall 2100 and the aft wall 2105. Alternatively, the forward wall 2100 and the aft wall 2105 can secure together by other suitable methods, such as by adhesive, welding, or threading.

A turbine 2115 is housed within the turbine housing 1905 and includes a series of blades 2120, and preferably in a range of ten to fifteen blades 2120. The blades 2120 are spaced from an axle 2125 by a stem 2030. A turbine surface 2133 curves radially outwardly and directs the water flow 110 radially outwardly to the scroll 1920. The distance between the forward wall 2100 and the turbine surface 2033 is reduced as the water flow 110 proceeds through the turbine 2115 to keep the flow area the same as the flow proceeds outward radially. This is done to prevent energy loss due to unnecessary acceleration and deceleration of the flow. More preferably, the turbine surface 2133 substantially aligns with the outer portion 2110 of the aft wall 2005 to minimize turbulent flow as the water is transferred from the turbine surface 2133 to the scroll 1920.

The axle 2125 extends through the center of the turbine housing 1905 and couples to a nose cone 2130 at its forward end. The nose cone 2130 provides the axle 2125 a small clearance to allow for free rotation. Preferably, at least one bearing 2135 couples the axle 2125 to the nose cone 2130. The bearing 2135 may comprise a roller bearing, which may be sealed. A nut 2140 secures the bearing 2135 in place. The nut 2140 is tightened onto external threading on the forward end of the axle 2125.

The nose cone 2130 is supported within the inlet 1910 and directs the water flow 110 to the blades 2120. Preferably, the downstream diameter of the nose cone 2130 substantially aligns with the turbine surface 2133 to minimize turbulent flow and maximize the amount of water flow 110 impacting the blades 2120. The nose cone 2130 is supported within the center of the inlet 1910 by a plurality of radial support arms 2145, and preferably in a range of two to eight radial support arms 2145. The radial support arms 2145 may be angled with respect to the flow to effect an inlet flow angle for improving turbine efficiency.

The axle 2125 couples to the aft wall 2105 at its downstream end. The aft wall 2105 extends downstream to provide a coupling surface 2150 for the axle 2125. The coupling surface 2150 provides a small clearance to allow the axle 2125 to freely rotate. Preferably, at least one bearing 2155 couples the axle 2130 to the coupling surface 2150 of the aft wall 2105. The bearing 2155 may comprise a roller bearing, which may be sealed. More preferably, the bearing 2155 includes a spiral grooved hole on an inside diameter thereof to provide a place for grit in the water flow 110 to drop and be contained if any grit gets into the bearing area. A nut 2160 secures the bearing 2155 in place. The nut 2160 is tightened onto external threading on the downstream end of the axle 2125.

By one approach, as shown in FIG. 25, the aft wall 2105 extends downstream axially of the outer portion 2110 to accommodate the blades 2120 and a series of magnets 2165 mounted to the blades 2120. Mounted on the air side of the aft wall 2105 generally radially aligned with the magnets 2165 are a series of coils 2170, spaced equidistant about the aft wall 2105. Although each coil 2170 is preferably created with insulated copper wire, however, other known conductive materials may be used. Each coil 2170 is wrapped around a core 2175 projecting outward from the aft wall 2105. The cores 2175 are preferably made of iron to increase the ability of the coils 2170 to create voltage when the coils 2170 are crossed by a magnetic field. The coils 2170 and the cores 2175 are securely attached to the aft wall 2105 by any suitable method, such as by adhesive, welding, or hardware. Alternatively, the cores may be integrally formed with the aft wall 2105. As shown in FIG. 25, the coils 2170 preferably are mounted outside of radial turbine housing 1900. The coils 2170 also can be mounted inside of the radial turbine housing 1900. For example, this may be accomplished by extending the aft wall 2105 downstream and mounting the coils 2170 to an inner surface of this area.

When the water flow 110 drives the blades 2120 to rotate within the radial turbine housing 1905 on the axle 2125, the magnets 2165 and their magnetic fields rotate as well. As the magnets 2165 and their corresponding magnetic fields are driven past the coils 2170, the magnets 2165 generate an electric current within the coils 2170. The coils 2170 are connected to the power conditioning circuit 115 to alter the current into a range capable of being stored. The radial turbine module 1900 can be installed in an irrigation system to convert the hydro energy of the water flow 110 into electrical energy to be stored, such as in a capacitor or by way of charging the electrical energy storage device 120, which can then supply, as required, power to the irrigation components 125. For example, the radial turbine module 1900 can be installed downstream and proximate to a valve, and the electrical energy storage device 120 can supply power to a solenoid controlling the opening of the valve. Thus, when the module 1900 turns on the valve, it also begins to produce energy from the flow through the valve to the module 1900. Alternatively, the radial turbine module 1900 can be positioned near communication devices, sensors, and controllers to supply such with electricity.

Additionally, the frequency of the current can be monitored to determine the flow through the turbine 2115. The frequency produced by the turbine 2115 directly corresponds to the amount of water flow 110 through the turbine 2115. By monitoring the frequency of the current, the turbine 2115 measures the flow rate of the water flow 110 through the turbine 2115 and produces power to supply electricity to the irrigation components 125 at the same time. The flow measurements can be communicated wirelessly back to a controller, and the wireless communication device can be powered by the turbine 2115.

Figure 26:
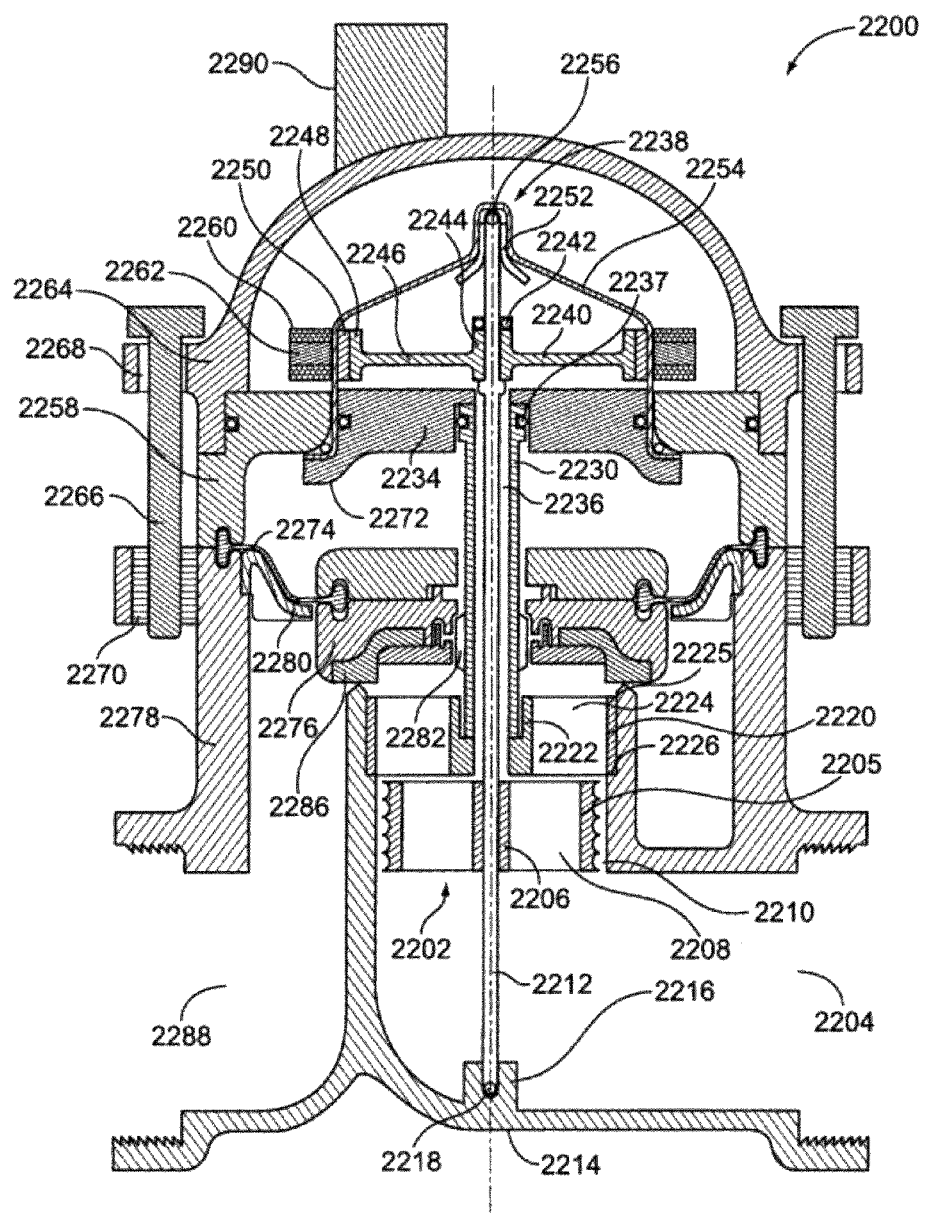
FIG. 26 is a cross section of a valve housing another power generation module configured in accordance with various features of the invention.

Referring now to FIG. 26, the power generation module 100 is incorporated into a valve 2200 and includes a turbine module 2202 that communicates with the water flow 110 in the irrigation conduit 105 to interface with the hydro energy to convert the hydro energy into electrical energy.

An inlet 2204 couples to the irrigation conduit 105 and includes internal threading to engage external threading provided on the irrigation conduit 105. Preferably, the inner diameter of the inlet 2204 is generally consistent with the inner diameter of the irrigation conduit 105 to minimize the pressure drop through the coupling.

The valve 2200 is a forward flow valve, so the inlet 2204 turns generally ninety degrees directing the water flow 110 to the turbine module 2202 situated in this generally vertical portion of the valve inlet immediately upstream from a valve seat. The turbine module 2202 includes a turbine 2205 with a hub portion 2206 and a series of blades 2208 extending radially from the hub portion 2206 and to a shroud 2210. The shroud 2210 interlocks with the blades 2208 and has a labyrinth seal on its outer diameter to encourage flow through the blades 2208, rather than around the outside of the shroud 2210. Alternatively, the turbine 2205 could be employed without a shroud, which would reduce the centrifugal load on the blades 2208, but would reduce the efficiency of the turbine. Preferably, the shroud 2210 provides a small clearance with the inlet 2204 to allow for free rotation and maximize the water flow 110 flowing through the turbine 2205. A stator (not shown) may be installed upstream of the turbine to straighten flow before entering the turbine 2205.

The hub portion 2206 of the turbine 2205 couples to an axle 2212. Preferably, the hub portion 2206 is secured to the axle 2212 by an interference fit (friction fit). Alternatively, the hub portion 2206 could be secured by other suitable methods, such as by adhesive, welding, or hardware. The axle extends to the bottom of the generally ninety degree turn of the inlet 2204 and secures to a base 2214 of the valve 2200. The axle 2212 is housed within a cylindrical lower bearing 2216 projecting from the base 2214. Preferably, the lower bearing 2216 provides a small clearance with the axle 2212 to allow for free rotation. More preferably, a bearing 2218 also is provided within the lower bearing 2216 to facilitate the rotation of the axle 2212. The bearing 2218 may comprise a thrust bearing to support axial loads from the axle 2212.

A strut 2220 is provided downstream of the turbine 2205 to support an isolation tube 2230. The strut includes a hub portion 2222 and a series of radial support arms 2224 extending radially from the hub portion 2222 to a strut outer ring 2225, and preferably six radial support arms 2224. Preferably, the inlet 2204 increases in diameter at a right angle to provide a shelf 2226 where it supports the strut outer ring 2225 so that the strut 2220 can support the isolation tube 2230. Alternatively, the strut outer ring 2225 could be coupled to the inlet 2204 by other suitable methods, such as by adhesive, welding, threading, or hardware.

The hub portion 2222 supports an isolation tube 2230 on an inner diameter thereof. The isolation tube 2230 extends up from the hub portion 2222 to couple to an inner bonnet 2234. Preferably, a seal 2237 couples the isolation tube 2230 to the inner bonnet 2234. The axle 2212 extends through the axle chamber 2236 past the inner bonnet 2234 into a generator assembly 2238.

The generator assembly 2238 includes a rotor 2240 coupled to the axle 2212 and secured by a rotor nut 2242. The rotor 2240 includes a hub portion 2244 and a series of spokes 2246 extending radially from the hub portion 2244 to a shroud 2248. The shroud 2248 interlocks with the spokes 2246 and increases damping, thereby reducing blade flutter. Alternatively, a solid cylinder could connect the hub portion 2244 with the shroud 2248. A series of magnets 2250 are mounted to the shroud 2248, and preferably to an outer periphery of the shroud 2248. The rotor 2240 preferably has an I-shaped cross section to maximize the surface area coupled to the axle 2212 and minimize weight, which requires less force to rotate.

Above the rotor 2240, the axle 2212 extends into a bushing 2252 coupled to a rotor housing 2254. The bushing 2252 provides a small clearance to allow for free rotation of the axle 2212. Preferably, a bearing 2256 couples the axle 2212 to the bushing 2252 to facilitate the rotation of the axle 2212. The bearing 2256 may comprise a thrust bearing to support axial loads from the axle 2212.

The rotor housing 2254 extends down around the axle 2212 and then angles radially outward and downward to provide an interior space within which the rotor 2240 rotates. There is no seal provided between the isolation tube 2230 and the axle 2212. Accordingly, the water flow 110 has access to the interior space of the rotor housing 2254 and this interior space sees the same pressure as the inlet 2204. As the rotor housing 2254 extends past the outer diameter of the rotor 2240, the rotor housing 2254 turns downward and is secured and sealed between the inner bonnet 2234 and an outer bonnet 2258. Accordingly, the air side of the rotor housing 2254 is dry.

A series of coils 2260, and preferably a range of four to fourteen coils 2260, are disposed on the air-side of the rotor housing 2254 generally aligned with the rotor 2240 and spaced equidistant about the rotor housing 2254. Although, each coil 2260 is preferably created with insulated copper wire other known conductive materials may be used. Each coil 2260 is wrapped around a core 2262 projecting outward from the rotor housing 2254. The cores 2262 are preferably made of iron to increase the ability of the coils 2260 to create voltage when the coils 2260 are crossed by a magnetic field. The coils 2260 and the cores 2262 are securely attached to the rotor housing 2254 by any suitable method, such as by adhesive, welding, or hardware. As shown in FIG. 26, the coils 2260 preferably are mounted outside of the rotor housing 2254. Alternatively, the coils 2260 can be mounted inside of the rotor housing 2254. For example, this may be accomplished by extending the rotor housing 2254 further past the rotor 2240 and mounting the coils 2260 to an inner surface of this area. A cover 2264 is disposed over the generator assembly 2238 and couples to the outer bonnet 2258. Preferably, the cover 2264 is secured to the outer bonnet 2258 by a series of screws 2266 inserted into holes 2268 and tightened onto threaded couplers 2270 extending outward from the outer bonnet 2258. More preferably, the cover 2264 is secured to the outer bonnet 2258 by a range of four to ten screws 2266.

Preferably, the inner bonnet 2234 includes a lip 2272 that overlaps the outer bonnet 2258 creating radial pilot and seal. More preferably, the inner bonnet 2234 and the outer bonnet 2258 are sealed within this area to form a watertight seal preventing water from entering the generator assembly 2238.

A diaphragm 2274 extends from the outer bonnet 2234 to a seal assembly 2276. Preferably, the diaphragm 2274 is securely sandwiched between the outer bonnet 2234 and a valve body 2278. The valve body 2278 is radially outward of the inlet 2204. The diaphragm 2274 rests on a diaphragm support 2280 extending radially inwardly from the valve body 2278. The seal assembly 2276 is positioned over the inlet 2204 above the strut 2220. A seal 2282 is provided between the seal assembly 2276 and the isolation tube 2230 to prevent water from flowing above the diaphragm 2284 and the seal assembly 2276 while also allowing relative axial movement of the seal assembly 2276 along the isolation tube 2230. The seal assembly 2276 includes a seat 2286 that rests across the inlet to restrict water flow when the valve 2200 is turned off.

An outlet 2288 allows the water flow 110 to flow out of the valve 2200 on a side opposite to the inlet 2204. The outlet 2288 and the inlet 2204 share an inner wall and the valve body 2278 extends down to form the outlet 2288. Preferably, the outlet 2288 increases in diameter to couple to the irrigation conduit 105 and includes internal threading to engage external threading provided on the irrigation conduit 105. Preferably, the inner diameter of the outlet 2288 is generally consistent with the inner diameter of the irrigation conduit 105 to minimize the pressure drop through the coupling.

During operation, a controller (not shown) activates a solenoid 2290 which bleeds water from above the diaphragm 2274 until the pressure from the water flow 110 forces the seal assembly 2276 upward. When the seat 2286 is forced off of the inlet, the water flow 110 enters the valve body 2278 and flows out through the outlet 2288. As the water flows through the valve 2200, the turbine 2205 is rotated by the water flow 110, which drives the rotation of the axle 2212 and the rotor 2240. When the water flow 110 drives the rotation of the rotor 2240, the magnets 2250 and their magnetic fields rotate as well. As the magnets 2250 are driven past the coils 2260, the magnets 2250 generate an electric current within the coils 2260. The coils 2260 are connected to the power conditioning circuit 115 to alter the current to a range capable of being stored. The valve 2200 can be installed in an irrigation system to convert the hydro energy of the water flow 110 into electrical energy to be stored in the electrical energy storage device 120, which can then supply power to the irrigation components 125. For example, the electrical energy storage device 120 can supply power to the solenoid controlling the opening of the valve 2200. Thus, when the valve is turned on, it also begins to produce energy.

Additionally, the frequency of the current can be monitored to determine the flow through the valve 2200. The frequency produced by the turbine 2205 in the valve 2200 directly corresponds to the amount of water flow 110 through the valve. By monitoring the frequency of the current, the turbine 2205 measures the flow rate of the water flow 110 through the valve 2200 and produces power to supply electricity to the irrigation components 125 at the same time. The flow measurements can be communicated wirelessly back to a controller, and the wireless communication device can be powered by the power generation module 100 in the valve 2200.

This configuration can also be a retrofit design for converting non-powered conventional valves to powered valves. The bonnet, diaphragm, and seal assembly could be removed from the conventional valves, leaving only the valve body and the inlet and outlet ports. The retrofit design can then be secured onto the conventional valve body, using an adapter kit which fits the turbine and generator into a conventional, already-installed valve body. This retrofit design is a cost-effective and easy-to-implement way to bring remote power to conventional systems. It can be implemented both on newer conventional valves and on older conventional valves installed long ago in an irrigation system.

Those skilled in the art will recognize that a wide variety of modifications, alterations, and combinations can be made with respect to the above described embodiments without departing from the scope of the invention. Such modifications, alterations, and combinations are to be viewed as being within the ambit of the inventive concept.

What is claimed is:

1. An irrigation power system for use with an irrigation conduit having water flow therethrough to provide hydro energy comprising:
   a hydro-electric power generation module along an irrigation conduit to convert the hydro energy to electrical energy;
   a power conditioning circuit to alter the electrical energy to produce a predetermined range of current;
   an electrical energy storage device communicating with the power conditioning circuit to receive the predetermined range of current for storage;
   an irrigation system component communicating with the electrical storage device to receive electrical power for operation of the component;
   the hydro-electric power generation module comprises a moveable surface communicating with the water flow to interface with the hydro energy; and
   the moveable surface comprising a piston.

2. The irrigation power system of claim 1 further comprising a piston cylinder that tees off of the irrigation conduit to house the piston therein.

3. The irrigation power system of claim 1 further comprising a spring, wherein movement of the piston causes the spring to store energy, and the spring releases the energy to energize a generator to generate power.

4. The irrigation power system of claim 3 wherein the spring is a coil spring that the piston causes to wind and that unwinds to rotate a generator shaft to generate power.

5. The irrigation power system of claim 1 further comprising a return spring that compresses with a first movement of the piston caused by water flow and expands to cause a second movement of the piston opposite to the first movement.

6. The irrigation power system of claim 1 further comprising a clutch gear coupled to the piston that couples to and drives a shaft when driven in a first stroke direction and that uncouples from the shaft when driven in a second stroke direction.

7. The irrigation power system of claim 6 further comprising a second clutch gear coupled to the piston that couples to and drives the shaft when driven in the second stroke direction and that uncouples from the shaft when driven in a first stroke direction.

8. The irrigation power system of claim 3 further comprising a gear system to convert linear energy of the piston to rotational energy to cause the spring to store energy.

9. The irrigation power system of claim 8 wherein the gear system comprises a rack and pinion, wherein movement of the piston drives the rack which rotates the pinion to convert linear energy to rotational energy to wind the spring.

10. The irrigation power system of claim 9 wherein the gear system further comprises a motor gear that is driven by the pinion to wind the spring, and wherein there is a positive gear ratio between the motor gear and the pinion.

11. The irrigation power system of claim 9 wherein the pinion further comprises a clutch gear coupled to the rack that couples to and drives a pinion shaft when driven in a first stroke direction and that uncouples from the pinion shaft when driven in a second stroke direction.

12. The irrigation power system of claim 11 wherein the pinion further comprises a second clutch gear coupled to the rack that couples to and drives the pinion shaft when driven in the second stroke direction and that uncouples from the pinion shaft when driven in a first stroke direction.

13. The irrigation power system of claim 9 wherein the rack further comprises toothless slots, wherein movement of the piston drives the rack which rotates the pinion to convert linear energy to rotational energy to wind the spring until the toothless slots are driven to the pinion which releases the pinion from the rack which releases the spring to unwind and rotate a generator to generate power.

14. An irrigation power system for use with an irrigation conduit having water flow therethrough to provide hydro energy comprising:
   a hydro-electric power generation module along an irrigation conduit to convert the hydro energy to electrical energy;
   a power conditioning circuit to alter the electrical energy to produce a predetermined range of current;
   an electrical energy storage device communicating with the power conditioning circuit to receive the predetermined range of current for storage;
   an irrigation system component communicating with the electrical storage device to receive electrical power for selective operation of the component;
   the hydro-electric power generation module comprises a moveable surface communicating with the water flow to interface with the hydro energy;
   the moveable surface comprising at least one blade of a turbine and the turbine is mounted within the water flow of the irrigation conduit;
   the at least one magnet mounted to the turbine for movement therewith; and
   at least one coil;
   wherein the turbine drives the at least one magnet, with its magnetic field, past the at least one coil to create a current supply to the power conditioning circuit.

15. The irrigation power system of claim 14 wherein the at least one magnet is mounted to the outer periphery of the turbine to rotate within the irrigation conduit.

16. The irrigation power system of claim 14 wherein the at least one coil is mounted outside of the irrigation conduit.

17. The irrigation power system of claim 14 wherein an outer periphery of the turbine is configured to cooperate with an inner surface of the irrigation conduit to create a flow discourager arrangement.

18. The irrigation power system of claim 14 wherein a value associated with the predetermined range of current is communicated to a controller, which determines a flow rate through the turbine based on the value.

19. The irrigation power system of claim 14 wherein the irrigation system component includes at least one of a communication device, a valve, a sensor, and lighting.

20. An irrigation power system for use with an irrigation conduit having water flow therethrough to provide hydro energy comprising:
   a hydro-electric power generation module along an irrigation conduit to convert the hydro energy to electrical energy;
   a power conditioning circuit to alter the electrical energy to produce a predetermined range of current;
   an electrical energy storage device communicating with the power conditioning circuit to receive the predetermined range of current for storage;
   an irrigation system component communicating with the electrical storage device to receive electrical power for selective operation of the component;
   the hydro-electric power generation module comprises a moveable surface communicating with the water flow to interface with the hydro energy;
   the moveable surface comprises at least one blade of a turbine and the turbine is mounted within the water flow of the irrigation conduit;
   at least one strut mounted to the irrigation conduit;
   an axle;
   the turbine is rotatably coupled to the axle and supported by the at least one strut; and
   at least one bearing, wherein the bearing couples the axle to the at least one strut.

21. The irrigation power system of claim 20 wherein the bearing inside diameter comprises a spiral groove hole.

22. The irrigation power system of claim 20 wherein an outer periphery of the turbine is configured to cooperate with an inner surface of the irrigation conduit to create a flow discourager arrangement.

23. An irrigation power system for use with an irrigation conduit having water flow therethrough to provide hydro energy comprising:
   a hydro-electric power generation module along an irrigation conduit to convert the hydro energy to electrical energy;
   a power conditioning circuit to alter the electrical energy to produce a predetermined range of current;
   an electrical energy storage device communicating with the power conditioning circuit to receive the predetermined range of current for storage;
   an irrigation system component communicating with the electrical storage device to receive electrical power for selective operation of the component;
   the hydro-electric power generation module comprises a moveable surface communicating with the water flow to interface with the hydro energy;
   the surface comprises at least one blade of a turbine and the turbine is mounted within the water flow of the irrigation conduit; and
   the turbine is radially supported by the irrigation conduit.

24. The irrigation power system of claim 23 further comprising at least one bearing, wherein the at least one bearing engages the outer periphery of the turbine and the irrigation conduit.

25. The irrigation power system of claim 23 wherein an outer periphery of the turbine engages an inner surface of the irrigation conduit to create a flow discourager.

26. An irrigation power system for use with an irrigation conduit having water flow therethrough to provide hydro energy comprising:
   a hydro-electric power generation module along an irrigation conduit to convert the hydro energy to electrical energy;
   a power conditioning circuit to alter the electrical energy to produce a predetermined range of current;
   an electrical energy storage device communicating with the power conditioning circuit to receive the predetermined range of current for storage;
   an irrigation system component communicating with the electrical storage device to receive electrical power for selective operation of the component;
   wherein the hydro-electric power generation module comprises a moveable surface communicating with the water flow to interface with the hydro energy; and
   the moveable surface comprises at least one blade of a radial turbine and the radial turbine includes a scroll passage and is mounted within along the water flow of the irrigation conduit.

27. The irrigation system of claim 26 further comprising:
   at least one magnet mounted to the radial turbine for movement therewith; and at least one coil;
wherein the radial turbine drives the at least one magnet, with its magnetic field, past the at least one coil to create a current supply to the power conditioning circuit.

28. The irrigation system of claim 27 wherein the at least one coil is mounted outside of the irrigation conduit.

29. The irrigation system of claim 27 wherein a value associated with the predetermined range of current is communicated to a controller, which determines a flow rate through the radial turbine based on the value.

30. The irrigation system of claim 26 further comprising:
an axle coupled to the radial turbine to be driven thereby; and
a generator shaft;
wherein the radial turbine drives the axle which rotates the generator shaft to generate power.

31. The irrigation power system of claim 30 wherein a value associated with the predetermined range of current is communicated to a controller, which determines a flow rate through the radial turbine based on the value.

32. An irrigation valve for use with an irrigation conduit having water flow therethrough comprising:
a valve coupled to an irrigation conduit having a valve inlet upstream of a valve seat;
a hydro-electric power generation module in the valve inlet adjacent the valve seat to convert the hydro energy to electrical energy;
a power conditioning circuit communicating with the hydro-electric power generation module to alter the electrical energy to produce a predetermined range of current;
an electrical storage device communicating with the power conditioning circuit to receive the predetermined range of current for storage.

33. The irrigation power system of claim 32 wherein the hydro-electric power generation module comprises a turbine.

34. The irrigation power system of claim 33 further comprising:
a valve bonnet connected to the valve;
a turbine shaft coupled to the turbine and extending through the valve bonnet to couple to a rotor;
at least one magnet coupled to the rotor; and
at least one coil;
wherein the turbine drives the turbine shaft to drive the rotor which drives the at least one magnet, with its magnetic field, past the at least one coil to create a current supply to the power conditioning circuit.

35. The irrigation power system of claim 33 wherein a value associated with the predetermined range of current is communicated to a controller, which determines a flow rate through the valve based on the value.

* * * * *

UNITED STATES PATENT AND TRADEMARK OFFICE
CERTIFICATE OF CORRECTION

PATENT NO. : 8,294,292 B2
APPLICATION NO. : 12/428429
DATED : October 23, 2012
INVENTOR(S) : Kevin M. Irwin et al.

Page 1 of 1

It is certified that error appears in the above-identified patent and that said Letters Patent is hereby corrected as shown below:

IN THE CLAIMS:

Column 25, line 50, in claim 19, after "device," delete "a valve,".

Column 26, line 63, in claim 26, after "mounted" delete "within".

Signed and Sealed this
Fifth Day of May, 2015

Michelle K. Lee
*Director of the United States Patent and Trademark Office*